(12) United States Patent
Du

(10) Patent No.: US 9,870,050 B2
(45) Date of Patent: Jan. 16, 2018

(54) INTERACTIVE PROJECTION DISPLAY

(71) Applicant: Beijing Zhigu Rui Tuo Tech Co., Ltd, Beijing (CN)

(72) Inventor: Lin Du, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 0 days.

(21) Appl. No.: 15/028,019

(22) PCT Filed: Oct. 9, 2014

(86) PCT No.: PCT/CN2014/088242
§ 371 (c)(1),
(2) Date: Apr. 7, 2016

(87) PCT Pub. No.: WO2015/051751
PCT Pub. Date: Apr. 16, 2015

(65) Prior Publication Data
US 2016/0259406 A1 Sep. 8, 2016

(30) Foreign Application Priority Data
Oct. 10, 2013 (CN) .......................... 2013 1 0470128

(51) Int. Cl.
G09G 5/14 (2006.01)
G06F 3/01 (2006.01)
(Continued)

(52) U.S. Cl.
CPC ............... *G06F 3/013* (2013.01); *G02B 3/14* (2013.01); *G02B 7/287* (2013.01);
(Continued)

(58) Field of Classification Search
CPC ..................................................... G06F 3/013
(Continued)

(56) References Cited

U.S. PATENT DOCUMENTS 4,264,154 A 4/1981 Petersen
4,572,616 A 2/1986 Kowel et al.
(Continued)

FOREIGN PATENT DOCUMENTS

CN 1372650 10/2002
CN 1470227 1/2004
(Continued)

OTHER PUBLICATIONS

International Search Report dated Jan. 8, 2015 for PCT Application No. PCT/CN2014/088242, 2 pages.
(Continued)

Primary Examiner — Javid A Amini
(74) Attorney, Agent, or Firm — Amin, Turocy & Watson, LLP

(57) ABSTRACT

Disclosed are an interactive projection display method and an interactive projection display system. The method comprises: obtaining to-be-displayed location information corresponding to a coordination device; obtaining display information corres-ponding to the coordination device; generating, according to the display information, virtual display content corresponding to the coordination device; and projecting the virtual display content to a location corresponding to the to-be-displayed location information at a fundus of a user. According to the method and the system, virtual display content, used to interact with a user, of a coordination device is projected near the coordination device, to cause interaction between the user and the coordination device to be more convenient.

54 Claims, 8 Drawing Sheets

(51) Int. Cl.

| | | |
|---|---|---|
| *G02B 7/28* | (2006.01) | |
| *G02B 3/14* | (2006.01) | |
| *G02B 27/00* | (2006.01) | |
| *G02B 27/10* | (2006.01) | |
| *G06T 19/00* | (2011.01) | |
| *H04N 9/31* | (2006.01) | |
| *G02B 27/01* | (2006.01) | |

(52) U.S. Cl.
CPC ....... *G02B 27/0093* (2013.01); *G02B 27/017* (2013.01); *G02B 27/0179* (2013.01); *G02B 27/10* (2013.01); *G06F 3/017* (2013.01); *G06T 19/006* (2013.01); *H04N 9/3185* (2013.01); *G02B 2027/0178* (2013.01); *G02B 2027/0187* (2013.01)

(58) Field of Classification Search
USPC .......................................................... 345/633
See application file for complete search history.

(56) References Cited

U.S. PATENT DOCUMENTS

| | | | |
|---|---|---|---|
| 5,182,585 | A | 1/1993 | Stoner |
| 5,537,163 | A | 7/1996 | Ueno |
| 6,072,443 | A | 6/2000 | Nasserbakht et al. |
| 6,111,597 | A | 8/2000 | Tabata |
| 6,151,061 | A | 11/2000 | Tokuhashi |
| 6,152,563 | A | 11/2000 | Hutchison et al. |
| 6,325,513 | B1 | 12/2001 | Bergner et al. |
| 7,001,020 | B2 | 2/2006 | Yancey et al. |
| 7,298,414 | B2 | 11/2007 | Stavely et al. |
| 7,334,892 | B2 | 2/2008 | Goodall et al. |
| 7,486,988 | B2 | 2/2009 | Goodall et al. |
| 7,764,433 | B2 | 7/2010 | Kam et al. |
| 7,766,479 | B2 | 8/2010 | Ebisawa |
| 8,104,892 | B2 | 1/2012 | Hillis et al. |
| 8,109,632 | B2 | 2/2012 | Hillis et al. |
| 8,282,212 | B2 | 10/2012 | Hillis et al. |
| 8,384,999 | B1 | 2/2013 | Crosby et al. |
| 8,896,632 | B2 | 11/2014 | MacDougall et al. |
| 2002/0101568 | A1 | 8/2002 | Eberl et al. |
| 2002/0113943 | A1 | 8/2002 | Trajkovic et al. |
| 2003/0043303 | A1 | 3/2003 | Karuta et al. |
| 2003/0125638 | A1 | 7/2003 | Husar et al. |
| 2005/0003043 | A1 | 1/2005 | Sewalt et al. |
| 2005/0014092 | A1 | 1/2005 | Hasegawa et al. |
| 2005/0030438 | A1 | 2/2005 | Nishioka |
| 2006/0016459 | A1 | 1/2006 | McFarlane et al. |
| 2006/0103808 | A1 | 5/2006 | Horie |
| 2006/0122530 | A1 | 6/2006 | Goodall et al. |
| 2006/0146281 | A1 | 7/2006 | Goodall et al. |
| 2006/0164593 | A1 | 7/2006 | Peyghambarian et al. |
| 2006/0122531 | A1 | 8/2006 | Goodall et al. |
| 2007/0019157 | A1 | 1/2007 | Hills et al. |
| 2007/0211207 | A1 | 9/2007 | Lo et al. |
| 2008/0002262 | A1 | 1/2008 | Chirieleison |
| 2008/0106633 | A1 | 5/2008 | Blum et al. |
| 2009/0066915 | A1 | 3/2009 | Lai |
| 2009/0279046 | A1 | 11/2009 | Dreher et al. |
| 2009/0303212 | A1 | 12/2009 | Akutsu et al. |
| 2011/0018903 | A1* | 1/2011 | Lapstun .............. G02B 26/06 345/633 |
| 2011/0019258 | A1 | 1/2011 | Levola |
| 2011/0213462 | A1 | 1/2011 | Holladay |
| 2011/0051087 | A1 | 3/2011 | Inoue et al. |
| 2011/0242277 | A1 | 10/2011 | Do et al. |
| 2011/0279277 | A1 | 11/2011 | Li-Chung |
| 2012/0013389 | A1 | 1/2012 | Thomas et al. |
| 2012/0092618 | A1 | 4/2012 | Yoo et al. |
| 2012/0113235 | A1 | 5/2012 | Shintani |
| 2012/0127422 | A1 | 5/2012 | Tian et al. |
| 2012/0133891 | A1 | 5/2012 | Jiang |
| 2012/0140044 | A1 | 6/2012 | Galstian et al. |
| 2012/0154277 | A1 | 6/2012 | Bar-Zeev et al. |
| 2012/0169730 | A1 | 7/2012 | Inoue |
| 2012/0206485 | A1* | 8/2012 | Osterhout .......... G02B 27/0093 345/633 |
| 2012/0212499 | A1* | 8/2012 | Haddick ............ G02B 27/0093 345/589 |
| 2012/0212508 | A1* | 8/2012 | Kimball ............ G02B 27/0093 345/633 |
| 2012/0242698 | A1* | 9/2012 | Haddick ............ G02B 27/0093 345/633 |
| 2012/0290401 | A1 | 11/2012 | Neven |
| 2012/0307208 | A1 | 12/2012 | Trousdale |
| 2013/0044042 | A1 | 2/2013 | Olsson et al. |
| 2013/0050646 | A1 | 2/2013 | Nanbara |
| 2013/0072828 | A1 | 3/2013 | Sweis et al. |
| 2013/0107066 | A1 | 5/2013 | Venkatraman et al. |
| 2013/0127980 | A1 | 5/2013 | Haddick et al. |
| 2013/0135203 | A1 | 5/2013 | Croughwell, III |
| 2013/0147836 | A1* | 6/2013 | Small ...................... G06F 3/011 345/633 |
| 2013/0241805 | A1 | 9/2013 | Gomez |
| 2013/0241927 | A1* | 9/2013 | Vardi ................... G02B 27/017 345/419 |
| 2013/0278631 | A1* | 10/2013 | Border ................. G02B 27/017 345/633 |
| 2013/0335301 | A1 | 12/2013 | Wong et al. |
| 2013/0335404 | A1 | 12/2013 | Westerinen et al. |
| 2013/0342572 | A1* | 12/2013 | Poulos ................. G02B 27/017 345/633 |
| 2014/0078175 | A1 | 3/2014 | Forutanpour et al. |
| 2014/0160157 | A1* | 6/2014 | Poulos .................... G06F 3/011 345/633 |
| 2014/0225915 | A1* | 8/2014 | Theimer .............. G02B 27/017 345/633 |
| 2014/0225918 | A1* | 8/2014 | Mittal ..................... G06F 3/017 345/633 |
| 2014/0232746 | A1* | 8/2014 | Ro ...................... H04N 13/0402 345/633 |
| 2014/0240351 | A1* | 8/2014 | Scavezze ................ G06F 3/011 345/633 |
| 2014/0267400 | A1* | 9/2014 | Mabbutt ............... G06T 19/006 345/633 |
| 2014/0267420 | A1* | 9/2014 | Schowengerdt ........ G06F 3/012 345/633 |
| 2014/0282224 | A1 | 9/2014 | Pedley |
| 2014/0375680 | A1* | 12/2014 | Ackerman ............ G06T 19/006 345/633 |
| 2015/0002542 | A1* | 1/2015 | Chan ....................... G06F 3/048 345/633 |
| 2015/0035861 | A1* | 2/2015 | Salter ................... G02B 27/017 345/633 |
| 2015/0070391 | A1* | 3/2015 | Nishimaki ............ G06K 7/1404 345/633 |
| 2015/0234184 | A1* | 8/2015 | Schowengerdt ........ G02B 27/01 345/633 |
| 2015/0235632 | A1* | 8/2015 | Liu .......................... G09G 5/38 345/633 |
| 2016/0035139 | A1* | 2/2016 | Fuchs .................. G02B 27/017 345/633 |
| 2016/0171772 | A1* | 6/2016 | Ryznar ................. G02B 27/017 345/633 |
| 2016/0189432 | A1* | 6/2016 | Bar-Zeev ................. G02B 3/14 345/633 |
| 2016/0196603 | A1* | 7/2016 | Perez ....................... G06F 3/012 345/633 |

FOREIGN PATENT DOCUMENTS

| | | |
|---|---|---|
| CN | 1141602 | 3/2004 |
| CN | 1527126 | 9/2004 |
| CN | 1604014 | 4/2005 |
| CN | 1645244 | 7/2005 |
| CN | 1653374 | 8/2005 |
| CN | 1901833 | 1/2007 |
| CN | 1912672 | 2/2007 |
| CN | 2868183 | 2/2007 |
| CN | 1951314 | 4/2007 |
| CN | 101069106 | 11/2007 |

(56) References Cited

FOREIGN PATENT DOCUMENTS

| | | |
|---|---|---|
| CN | 101072534 | 11/2007 |
| CN | 101097293 | 1/2008 |
| CN | 101103902 | 1/2008 |
| CN | 201005945 | 1/2008 |
| CN | 101116609 | 2/2008 |
| CN | 101155258 | 4/2008 |
| CN | 101194198 | 6/2008 |
| CN | 101430429 | 5/2009 |
| CN | 201360319 | 9/2009 |
| CN | 201352278 | 11/2009 |
| CN | 101900927 | 1/2010 |
| CN | 101662696 | 3/2010 |
| CN | 201464738 | 5/2010 |
| CN | 101782685 | 7/2010 |
| CN | 101819331 | 9/2010 |
| CN | 101819334 A | 9/2010 |
| CN | 201637953 | 11/2010 |
| CN | 101917638 | 12/2010 |
| CN | 201754203 | 3/2011 |
| CN | 102008288 | 4/2011 |
| CN | 102083390 | 6/2011 |
| CN | 102203850 | 9/2011 |
| CN | 102292017 | 12/2011 |
| CN | 102419631 | 4/2012 |
| CN | 102481097 | 5/2012 |
| CN | 101149254 | 6/2012 |
| CN | 102487393 | 6/2012 |
| CN | 202267785 | 6/2012 |
| CN | 102572483 | 7/2012 |
| CN | 102576154 | 7/2012 |
| CN | 202383380 | 8/2012 |
| CN | 102918444 | 2/2013 |
| CN | 102939557 | 2/2013 |
| CN | 102981270 | 3/2013 |
| CN | 103054695 | 4/2013 |
| CN | 103065605 | 4/2013 |
| CN | 103150013 A | 6/2013 |
| CN | 103190883 | 7/2013 |
| CN | 103197757 | 7/2013 |
| CN | 103280175 A | 9/2013 |
| CN | 103297735 A | 9/2013 |
| CN | 103353663 | 10/2013 |
| CN | 103353667 | 10/2013 |
| CN | 103353677 | 10/2013 |
| CN | 103558909 A | 2/2014 |
| DE | 19959379 | 7/2000 |
| EP | 2646859 | 10/2013 |
| JP | 03023431 | 1/1991 |
| JP | 2676870 | 11/1997 |
| JP | H09289973 | 11/1997 |
| JP | 3383228 | 3/2003 |
| JP | 2003307466 | 10/2003 |
| JP | 2005058399 | 3/2005 |
| JP | 2007129587 | 5/2007 |
| JP | 2011-43876 A | 3/2011 |
| JP | 2012199621 | 10/2012 |
| JP | 2012247449 | 12/2012 |
| TW | 201012448 | 4/2010 |
| WO | 2004023167 | 3/2004 |
| WO | 2005077258 A1 | 8/2005 |
| WO | 2012075218 | 6/2012 |
| WO | 2012083415 | 6/2012 |
| WO | 2013074851 | 5/2013 |

OTHER PUBLICATIONS

International Search report dated Jun. 12, 2014 for PCT Application No. PCT/CN2013/088554, 4 pages.

Ji et al., "Real-Time Eye, Gaze and Face Pose Tracking for Monitoring Driver Vigilance", Real-Time Imaging 8, 357-377 (2002) available online at http://www.idealibrary.com, 21 pages.

International Search Report dated May 5, 2014 for PCT Application No. PCT/CN2013/088544, 4 pages.

International Search Report dated Jun. 5, 2014 for PCT Application No. PCT/CN2013/088549, 4 pages.

Smith, et al., "Determining Driver Visual Attention With One Camera", IEEE Transactions on Intelligent Transportation Systems, vol. 4, No. 4, Dec. 2003, 14 Pages.

Singh, et al., "Human Eye Tracking and Related Issues: A Review", International Journal of Scientific and Research Publications, vol. 2, Issue 9, Sep. 2012, ISSN 2250-3153, 9 pages.

Office Action dated Dec. 29, 2016 for U.S. Appl. No. 14/780,519, 25 pages.

Office Action dated Jun. 29, 2017 for U.S. Appl. No. 14/783,495, 50 pages.

Office Action dated Jun. 29, 2017 for U.S. Appl. No. 14/783,503, 120 pages.

Gao et al. "Measuring Directionality of the Retinal Reflection with a Shack-Hartmann Wavefront Sensor", Dec. 2009, Optics Express, vol. 17, No. 25, Optical Society of America, 20 pages.

Office Action dated Jul. 12, 2017 for U.S. Appl. No. 14/780,519, 45 pages.

Office Action dated Jun. 8, 2017 for U.S. Appl. No. 14/779,968, 79 pages.

International Search Report dated Mar. 6, 2014 for PCT Application No. PCT/CN2013/088540, 8 pages.

Jeong, et al. "Tunable microdoublet lens array", Optics Express, vol. 12, Issue 11, May 2004, pp. 2494-2500.

International Search Report dated Apr. 3, 2014 for PCT Application No. PCT/CN2013/088531, 10 pages.

International Search Report dated Feb. 27, 2014 for PCT Application No. PCT/CN2013/088522, 6 pages.

International Search Report dated May 8, 2014 for PCT Application No. PCT/CN2013/088547, 4 pages.

Kim et al., "A 200 s Processing Time Smart Image Sensor for an Eye Tracker using pixel-level analog image processing", IEEE Journal of Solid-State Circuits, vol. 44, No. 9, Sep. 2009, 10 pages.

Hansen et al., "In the eye of the beholder: a survey of models for eyes and gaze", IEEE Transactions on pattern analysis and machine intelligence, vol. 32, No. 3, Mar. 2010, 23 pages.

International Search Report dated May 28, 2014 for PCT Application No. PCT/CN2013/088553, 6 pages.

International Search Report dated May 28, 2014 for PCT Application No. PCT/CN2013/088545, 4 pages.

Office Action dated May 3, 2017 for U.S. Appl. No. 14/781,306, 46 pages.

Office Action dated Feb. 27, 2017 for U.S. Appl. No. 14/783,495, 39 pages.

Office Action dated Apr. 21, 2017 for U.S. Appl. No. 14/781,581, 19 pages.

Office Action dated Apr. 20, 2017 for U.S. Appl. No. 14/781,578, 77 pages.

Office Action dated Oct. 4, 2017 for U.S. Appl. No. 14/781,584, 95 pages.

Office Action dated Nov. 9, 2017 for U.S. Appl. No. 14/781,578, 64 pages.

Office Action dated Nov. 9, 2017 for U.S. Appl. No. 14/780,519, 24 pages.

Office Action dated Nov. 17, 2017 for U.S. Appl. No. 14/783,495, 32 pages.

\* cited by examiner

INTERACTIVE PROJECTION DISPLAY

RELATED APPLICATION

The present application is a U.S. National Stage filing under 35 U.S.C. §371 of international patent cooperation treaty (PCT) application No. PCT/CN2014/088242, filed Oct. 9, 2014, and entitled "INTERACTIVE PROJECTION DISPLAY", which claims the benefit of priority to Chinese Patent Application No. 201310470128.X, filed on Oct. 10, 2013, which applications are hereby incorporated into the present application by reference herein in their respective entireties.

TECHNICAL FIELD

The present application relates to the field of device interaction technologies, e.g., to interactive projection display.

BACKGROUND

Wearable devices, such as Google glasses, smart watches, smart gloves, and smart accessories (for example, smart rings and smart bands), are gradually accepted by the public, and these electronic smart devices bring more convenience to people's daily lives. However, because the wearable devices generally have the features of fitting a user, being compact and lightweight, having low energy consumption, and the like, these features determine that most wearable devices (for example, the above-mentioned smart watches, smart gloves, and smart accessories) do not have strong display, processing, and interaction capabilities.

Data in these wearable devices can be exported into a device that has strong display and processing capabilities, such as a computer or a smart phone, so as to implement interaction between these wearable devices and a user. However, such an interaction method is inconvenient, and it may cause that the user cannot interact with these wearable devices in real time.

In addition, because smart glasses are directly related to the eyes of the user and generally have a strong display capability, the smart glasses may also be used to enhance the display capability of other wearable devices. However, the user often wants to switch the sight line between a display interface of the smart glasses and other wearable devices, and the focal point of the eye frequently changes, which brings poor experience such as dizziness to the user.

SUMMARY

An objective of the present application is to provide an interactive projection display method and system, wherein virtual display content, used to interact with a user, of a coordination device is projected near the coordination device, to cause interaction between the user and the coordination device to be more convenient.

According to a first aspect of embodiments of the present application, an interactive projection display method is provided, comprising:
  obtaining to-be-displayed location information corresponding to a coordination device;
  obtaining display information corresponding to the coordination device;
  generating, according to the display information, virtual display content corresponding to the coordination device; and
  projecting the virtual display content to a location corresponding to the to-be-displayed location information at a fundus of a user.

According to a second aspect of the embodiments of the present application, an interactive projection display system is further provided, comprising:
  a location information obtaining apparatus, configured to obtain to-be-displayed location information corresponding to a coordination device;
  a display information obtaining apparatus, configured to obtain display information corresponding to the coordination device;
  a content generating apparatus, configured to generate, according to the display information, virtual display content corresponding to the coordination device; and
  a projection apparatus, configured to project the virtual display content to a location corresponding to the to-be-displayed location information at a fundus of a user.

According to the method and the system in the embodiments of the present application, device location information and display information that correspond to a coordination device (which particularly is a wearable device having a weak display capability or having no display capability) are obtained, and a corresponding virtual display image is generated according to the device location information and the display information and is then projected to a fundus of a user, to cause that the user sees the virtual display image that is presented near the coordination device, and the user even can feel that the virtual display image is displayed by the coordination device, which greatly facilitates interaction between the user and the coordination device, and improves the user experience.

According to the method and the apparatus in the embodiments of the present application, devices having different functions work in a coordinated manner, that is, a defect that a display capability of the coordination device is inadequate is remedied by using strong projection and display functions of a device near an eye; therefore, the devices are all functioned optimally, and the user experience is improved.

DETAILED DESCRIPTION

A method and an apparatus in the present application are described in detail below with reference to the accompanying drawings and embodiments.

Figure 1:
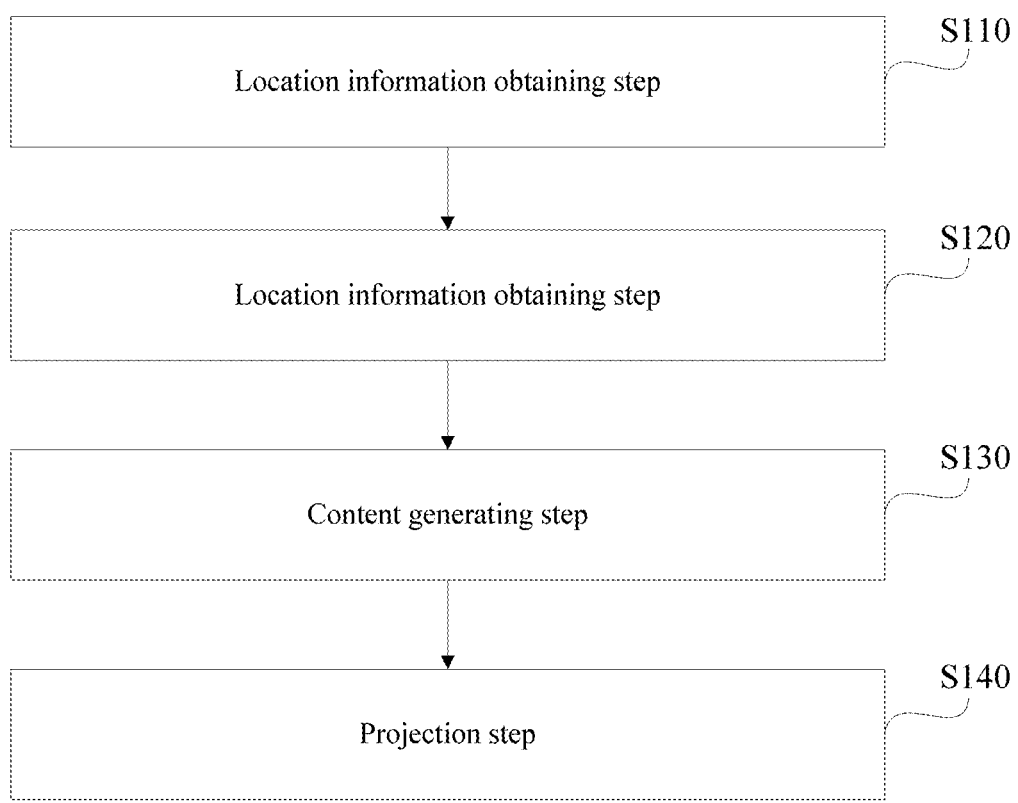
FIG. 1 is a schematic flowchart of an interactive projection display method according to an embodiment of the present application.

Some wearable devices cannot have a large size due to their functions and/or a requirement of being conveniently carried; as a result, the wearable devices cannot implement information display with high quality, and the problem cannot be fundamentally solved only by changing designs of the devices. Therefore, this problem needs to be solved starting from at least one other device. Therefore, as shown in FIG. 1, an embodiment of the present application provides an interactive projection display method, comprising:

S110: A location information obtaining step: obtaining current to-be-displayed location information corresponding to a coordination device.

S120: A display information obtaining step: obtaining current display information corresponding to the coordination device.

S130: A content generating step: generating, according to the display information, current virtual display content corresponding to the coordination device.

S140: A projection step: projecting the virtual display content to a location corresponding to the to-be-displayed location information at a fundus of a user.

In the method in the embodiment of the present application and the following corresponding apparatus embodiments, the to-be-displayed location information is information related to a to-be-displayed location. The to-be-displayed location is a location at which the virtual display content that the user sees is presented.

In the method in the embodiment of the present application, the virtual display content corresponding to the coordination device is projected to the fundus of the user according to the to-be-displayed location, to cause that the virtual display content that the user sees is imaged at the to-be-displayed location, and the user does not need to switch back and forth his or her location of gaze point between a display device and the coordination device substantially when the user interacts with the coordination device by using the virtual display content displayed at the to-be-displayed location, which more conforms to a use habit of the user and improves the user experience.

In a possible implementation manner of the embodiment of the present application, the coordination device preferably is a wearable device, and more preferably is a wearable device having a weak display capability, such as a smart watch, a smart ring, a smart band, or a smart necklace. Certainly, those skilled in the art may know that, the present application may be further applied to another portable device or a fixed device that has a weak display capability, or applied to a scenario in which the coordination device has a display capability but the display capability needs to be enhanced.

In a possible implementation manner of the embodiment of the present application, in the location information obtaining step S110, information corresponding to a current to-be-displayed location may be obtained in multiple manners, for example, in one of the following several manners:

1) Current device location information of the coordination device is obtained, and then, the current to-be-displayed location information is determined according to the current device location information of the coordination device. For example, the current to-be-displayed location may be set, according to a preset rule or a rule generated in real time according to a current environment, at a location related to the coordination device, for example, the current to-be-displayed location is set at an upper side of the coordination device.

2) The information corresponding to the current to-be-displayed location is obtained through interaction with the user. For example, a gesture and a location of a hand of the user are obtained by using a detection apparatus, to obtain a current to-be-displayed location set by the hand of the user (for example, the user draws a block by hand, and a region corresponding to the block is the current to-be-displayed location needed by the user), or the to-be-displayed location information may be input manually by the user (for example, data such as a distance between the to-be-displayed location and an eye of the user, an angle, and a size of the to-be-displayed location is input).

In the foregoing method 1), there are multiple methods for obtaining the current device location information of the coordination device, for example:

a) The current device location information of the coordination device is received.

In a possible implementation manner of the embodiment of the present application, the current device location information of the coordination device may be received from the coordination device. That is, the coordination device obtains and sends the current device location information of the coordination device, and then, in the method embodiment, the location information is received. The coordination device, for example, may obtain a location of the coordination device by using a location sensor such as a positioning module (for example, a global positioning system or indoor positioning).

In another possible implementation manner of the embodiment of the present application, the current device location information of the coordination device may also be received from another external device. Herein, the another external device may be another portable or wearable device, for example, a mobile phone with strong processing performance; or the another external device may be a device such as a remote server (for example, a cloud server). The coordination device transfers the current device location information of the coordination device to the another external device, and then, the another external device forwards the information, to cause that, in the method in the embodiment of the present application, the current device location information of the coordination device is received indirectly. In addition, in another possible implementation manner of the embodiment of the present application, the another external device may obtain, by itself, the current device location information of the coordination device, and then, forward the information to be received in the method in the embodiment of the present application, and for example, the another external device may be an external positioning apparatus.

b) The current device location information of the coordination device is detected.

In a possible implementation manner of the embodiment of the present application, the detecting the current device location information of the coordination device comprises:

detecting a location of a current gaze point of the user; and determining the current device location information of the coordination device according to the location of the gaze point.

For example, in a possible implementation manner of the embodiment of the present application, information that the user is currently gazing at the coordination device may be obtained in a manner of interacting with the user; in this case, after the location of the current gaze point of the user is detected, the location of the gaze point is the current device location information of the coordination device.

In another possible implementation manner of the embodiment of the present application, an object corresponding to the location of the gaze point may be determined, and the current device location information of the coordination device is determined when it is determined that the object is the coordination device.

c) Interaction information of the user is detected; and the current device location information of the coordination device is determined according to the interaction information of the user.

The interaction information of the user may be the current device location information of the coordination device that is manually input by the user; and may also be interaction information detected by identifying an action or a gesture of the user, which is related to the current device location information of the coordination device and used to determine the current device location information of the coordination device.

d) Locally stored location related information of the coordination device is obtained.

By using that the coordination device is a smart watch as an example, for example, a relative location relationship, (for example, a distance between the smart watch and an eye, and an angle), between the smart watch and an eye of the user when the user normally looks at the smart watch and needs to interact with the smart watch, is obtained according to a feature of the user, for example, a shape feature or a use habit feature (the watch is worn at which wrist, a location of the watch on the wrist, amplitudes of lifting and bending a shoulder and an elbow when the user looks at the watch, and the like), and then, obtained data is locally stored, and the location related information is obtained locally and directly.

Certainly, those skilled in the art may know that, another method for obtaining a location of the coordination device may also be used in the method in the embodiment of the present application.

There are multiple manners of detecting the location of the current gaze point of the user in the item b), which for example, comprise one or more of the following:

i) A pupil direction detector is used to detect an optical axis direction of an eye, and then, a depth sensor (such as an infrared distance meter) is used to obtain a depth of an eye-gazed scenario, and a location of a gaze point of a sight line of the eye is obtained. The technology is the prior art, and is not described in detail again in this implementation manner.

ii) Optical axis directions of two eyes are separately detected, then, directions of sight lines of the two eyes of the user are obtained according to the optical axis directions of the two eyes, and the location of the gaze point of the sight line of the eye is obtained by using an intersection point of the directions of the sight lines of the two eyes. The technology is also the prior art, and is not described in detail herein again.

iii) The location of the gaze point of the sight line of the eye is obtained according to an optical parameter of an optical path between an image acquisition device and the eye and an optical parameter of the eye (which mainly is the optical axis direction of the eye) when a clearest image presented on an imaging surface of the eye is acquired. The embodiment of the present application provides a specific process of the method below, which is not described in detail herein again.

Certainly, those skilled in the art may know that, in addition to the foregoing several methods for detecting the gaze point, another method that can be used to detect the gaze point of the eye of the user can also be used in the method in the embodiment of the present application.

The detecting the location of the current gaze point of the user by using the method iii) comprises:

S111: An image acquisition step: acquiring an image at the fundus of the user.

S112: An adjustable imaging step: adjusting an imaging parameter of an optical path between an image acquisition location and an eye until a clearest image is acquired.

S113: An image processing step: analyzing the acquired image to obtain the imaging parameter of the optical path between the image acquisition location and the eye and the optical parameter of the eye, wherein the imaging parameter and the optical parameter correspond to the clearest image; and calculating a location of the gaze point of the user relative to the user.

The optical parameter of the eye when the clearest image is acquired is obtained by analyzing and processing the image at the fundus of the eye, so as to obtain through calculation a location of a current focal point of the sight line, which provides a basis for further detecting an observing behavior of an observer based on the accurate location of the focal point.

The image presented at the "fundus" herein mainly is an image presented on a retina, which may be an image of the fundus, or an image of another object projected to the fundus, such as a light spot pattern mentioned below.

In step S112, a focal length of an optical device on the optical path between the eye and the acquisition location and/or a location of the optical device on the optical path may be adjusted, and the clearest image at the fundus can be obtained when the optical device is at a certain location or in a certain state. The adjustment may be continuous and in real time.

In a possible implementation manner of the method in the embodiment of the present application, the optical device may be a focal length adjustable lens, configured to adjust the focal length of the optical device by adjusting a refractive index and/or a shape of the optical device. Specifically:

1) The focal length is adjusted by adjusting curvature of at least one surface of the focal length adjustable lens, for example, the curvature of the focal length adjustable lens is adjusted by increasing or decreasing a liquid medium in a cavity formed by a two-layer transparent layer; and 2) the focal length is adjusted by changing the refractive index of the focal length adjustable lens, for example, the focal length adjustable lens is filled with a specific liquid crystal medium, an arrangement of the liquid crystal medium is adjusted by adjusting a voltage of an electrode corresponding to the liquid crystal medium, and therefore, the refractive index of the focal length adjustable lens is changed.

In another possible implementation manner of the method in the embodiment of the present application, the optical device may be a group of lenses, configured to adjust a focal length of the group of lenses by adjusting relative locations between the lenses in the group of lenses. Alternatively, one or more lenses in the group of lenses are the foregoing focal length adjustable lenses.

In addition to the foregoing two manners of changing an optical path parameter of a system by using a feature of the optical device, the optical path parameter of the system may also be changed by adjusting the location of the optical device on the optical path.

In addition, in the method in the embodiment of the present application, step S113 further comprises:

S1131: Analyze the image acquired in step S111, and find a clearest image.

S1132: Calculate the optical parameter of the eye according to the clearest image and an imaging parameter that is known when the clearest image is obtained.

The adjustment in step S112 causes that the clearest image can be acquired; however, the clearest image needs to be found by using step S113, and the optical parameter of the eye can be obtained through calculation according to the clearest image and a known optical path parameter.

Figure 2:
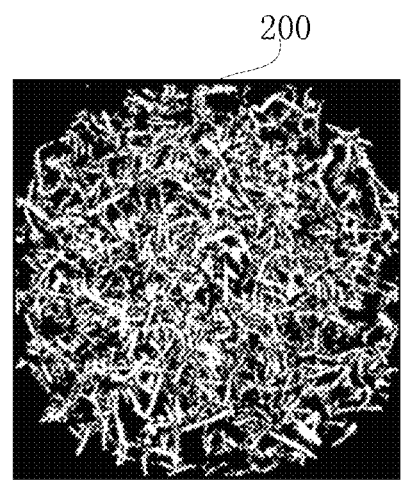
FIG. 2 is a schematic diagram of a light spot pattern used in an interactive projection display method according to an embodiment of the present application.
Figure 3:
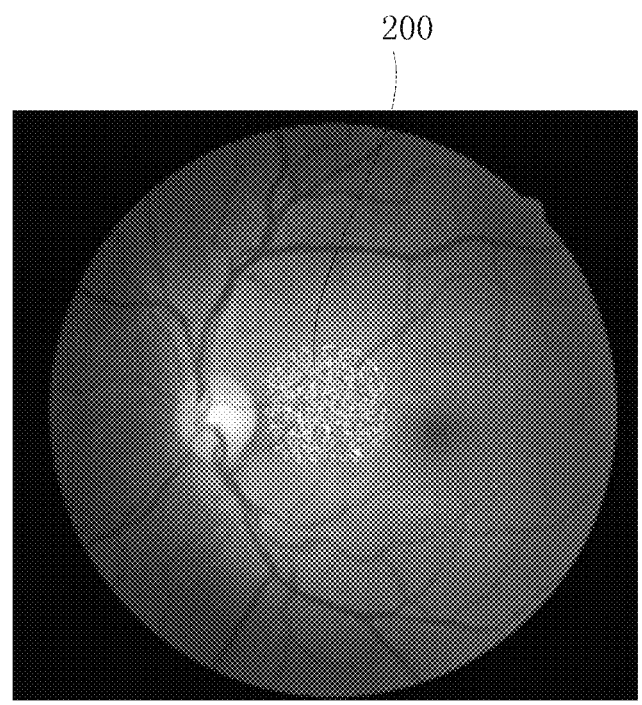
FIG. 3 is a schematic diagram of a fundus image having a light spot pattern and shot in an interactive projection display method according to an embodiment of the present application.

In the method in the embodiment of the present application, step S113 may further comprise:

S1133: Project a light spot to the fundus. The projected light spot may have no specific pattern and is only be used to illuminate the fundus. The projected light spot may further comprise a pattern with abundant features. The abundant features of the pattern may facilitate detection and improve the detection precision. FIG. 2 shows an example of a light spot pattern 200. The pattern may be formed by a light spot pattern generator, such as frosted glass. FIG. 3 shows an image acquired at the fundus when the light spot pattern 200 is projected.

In order not to affect normal viewing of the eye, preferably, the light spot is an eye-invisible infrared light spot. In this case, in order to reduce interference from other spectrums, a step of filtering out, in the projected light spot, light except eye-invisible light that transmits a lens may be performed.

Correspondingly, the method in the embodiment of the present application may further comprise the following steps:

S1134: Control luminance of the projected light spot according to a result obtained through analysis in step S1131. The analysis result comprises, for example, a feature of the image acquired in step S111, comprising a contrast of the feature of the image, a texture feature, and the like.

It should be noted that, a special case of controlling the luminance of the projected light spot is starting or stopping projection. For example, when an observer keeps gazing at a point, the projection may be stopped periodically; or when a fundus of the observer is bright enough, the projection may be stopped, and fundus information is used to detect a distance between a focal point of a current sight line of an eye and the eye.

In addition, the luminance of the projected light spot may be further controlled according to ambient light.

Preferably, in the method in the embodiment of the present application, step S113 may further comprise:

S1135: Calibrate a fundus image, to obtain at least one reference image corresponding to the image presented at the fundus. Specifically, comparative calculation is performed on the acquired image and the reference image, to obtain the clearest image. Herein, the clearest image may be an obtained image that is the least different from the reference image. In the method in this implementation manner, a difference between a currently obtained image and the reference image may be calculated by using an existing image processing algorithm, for example, by using a classic automatic phase difference focusing algorithm.

The optical parameter of the eye that is obtained in step S1132 may comprise an optical axis direction of the eye obtained according to a feature of the eye when the clearest image is acquired. The feature of the eye herein may be obtained from the clearest image, or may be obtained in another manner. The optical axis direction of the eye corresponds to a direction of a sight line at which the eye gazes. Specifically, the optical axis direction of the eye may be obtained according to a feature of the fundus when the clearest image is obtained. Determining the optical axis direction of the eye by using the feature of the fundus has a higher accuracy.

When the light spot pattern is projected to the fundus, a size of the light spot pattern may be greater than that of a fundus visible region or may be less than that of the fundus visible region.

When an area of the light spot pattern is less than or equal to that of the fundus visible region, a classic feature point matching algorithm (for example, the scale invariant feature transform (SIFT) algorithm) may be used to determine the optical axis direction of the eye by detecting a location, of the light spot pattern on the image, relative to the fundus.

When the area of the light spot pattern is greater than or equal to that of the fundus visible region, a location, of the light spot pattern on the obtained image, relative to an original light spot pattern (obtained through image calibration) may be used to determine the optical axis direction of the eye to determine a direction of a sight line of an observer.

In another possible implementation manner of the method in the embodiment of the present application, the optical axis direction of the eye may also be obtained according to a feature of a pupil of the eye when the clearest image is obtained. The feature of the pupil of the eye herein may be obtained from the clearest image, or may be obtained in another manner. Obtaining the optical axis direction of the eye by using the feature of the pupil of the eye is the prior art, and is not described in detail herein again.

In addition, the method in the embodiment of the present application may further comprise a step of calibrating the optical axis direction of the eye, so as to more accurately determine the optical axis direction of the eye.

In the method in the embodiment of the present application, the known imaging parameter comprises a fixed imaging parameter and a real-time imaging parameter, wherein the real-time imaging parameter is parameter information of the optical device when the clearest image is obtained, and the parameter information may be obtained in a manner of real-time recording when the clearest image is obtained.

After a current optical parameter of the eye is obtained, the location of the gaze point of the eye may be obtained with reference to the distance between the focal point of the eye and the eye, which is obtained through calculation (a specific process will be described in detail in combination with the apparatus part).

Preferably, in a possible implementation manner of the embodiment of the present application, the to-be-displayed location determining step comprises:

determining the current to-be-displayed location information according to the current device location information of the coordination device and a preset rule.

The preset rule herein, for example, may be that the to-be-displayed location is located above, below, at a left side of, at a right side of, surrounding the current location of the coordination device, or the like; or after ambient environment information of the coordination device is obtained by using a sensor (for example, an image acquisition sensor), the to-be-displayed location information may be determined according to the preset rule and the environment information.

In the embodiment of the present application, the current display information corresponds to an operation of the user on the coordination device, for example, if the user enters a number on the coordination device by using a key, the current display information comprises information corresponding to the entered number, and then, when the current display information is displayed, entering of the number is displayed. There are multiple methods for obtaining the current display information corresponding to the coordination device in step S120, that is, the display information obtaining step, which, for example, are one or more of the following:

1) The current display information corresponding to the coordination device is obtained from the coordination device.

In this method, the obtained display information is sent out by the coordination device.

2) The current display information corresponding to the coordination device is obtained from another external device.

Similar to the foregoing external device, in a possible implementation manner of the embodiment of the present application, the external device may be a portable device such as a mobile phone, a tablet computer, or a notebook computer, or may be a device such as a cloud server.

In a possible implementation manner, when the coordination device works with the embodiment of the present application in a coordinated manner, the external device may obtain the corresponding display information from the coordination device by using a communications module (which comprises a wired communications module and a wireless communications module, and preferably is the wireless communications module), and then sends out the display information.

In another possible implementation manner of the embodiment of the present application, the coordination device may only send operation related information to the external device, then, the external device generates the current display information after processing the operation related information, and then, sends the current display information to a device corresponding to the method in the embodiment of the present application. This manner, for example, may be preferably applied to a scenario in which a processing capability of the coordination device is weak, and information processing needs to be performed by the external device to generate the display information.

3) Information corresponding to a current state and an operation of the coordination device is obtained, and corresponding current display information is obtained locally after the corresponding information is processed.

Similar to that the current display information is generated through processing of the external device, in this implementation manner, the current display information is generated locally and directly. The method, for example, is preferably applied to a scenario in which a processing capability of the coordination device is weak and a processing capability of a device corresponding to the method in the embodiment of the present application is strong.

In order to enable the virtual display content projected in the projection step to have an effect of more conforming to the visual sense of the user from the user's perspective, in a possible implementation manner of the embodiment of the present application, in the content generating step, the virtual display content is generated according to the to-be-displayed location information and the display information. That is, the to-be-displayed location information is also considered when the virtual display content is generated. For example, in a possible implementation manner of the embodiment of the present application, the virtual display content comprises perspective information corresponding to the current to-be-displayed location. The perspective information, for example, may comprise depth information, perspective angle information, and the like.

In order to make the virtual display content that the user sees have a three-dimensional display effect and be more real, in a possible implementation manner of the embodiment of the present application, virtual display content separately corresponding to two eyes of the user is generated in the content generating step. That is, according to a three-dimensional display principle, virtual display content corresponding to the left eye and virtual display content corresponding to the right eye are separately generated, so that the virtual display content that the user sees has a suitable three-dimensional display effect. For example, it may give the user a feeling that, the virtual display content that the user sees is displayed by the coordination device, which brings better user experience.

In a possible implementation manner of the embodiment of the present application, the projection step S140 comprises:

S141: Project the virtual display content to the fundus.

S142: Adjust a projection imaging parameter of an optical path between a projection location and the fundus according to the current to-be-displayed location information.

In the embodiment of the present application, the projection imaging parameter is generated according to the current to-be-displayed location information, to cause the virtual display content that the user sees to be imaged on the to-be-displayed location, which facilitates interaction between the user and the coordination device.

In a possible implementation manner of the embodiment of the present application, step S142 comprises:

adjusting an imaging parameter of an optical device on the optical path between the projection location and the fundus and/or a location of the optical device on the optical path.

The imaging parameter herein comprises a focal length, an optical axis direction, and the like of the optical device. The virtual display content can be appropriately projected to the fundus of the user through the adjustment, for example, the virtual display content is clearly imaged at the fundus of the user by adjusting the focal length of the optical device, or from the perspective of three-dimensional display, in addition to directly generating an image of the left eye and an image of the right eye that are with parallax when the virtual display content is generated, the virtual display content corresponding to the two eyes of the user may be the same, but the virtual display content may also be projected to the two eyes with certain deviation, to achieve three-dimensional projection. In this case, for example, an optical axis parameter of the optical device may be adjusted.

When the user sees the virtual display content, a direction of a sight line of the eye may change, and it is required that the virtual display content be well projected to the fundus of the user when the directions of the sight line of the eye of the user are different. Therefore, in a possible implementation manner of the embodiment of the present application, the projection step S140 further comprises:

S143: Project, separately corresponding to locations of a pupil when optical axis directions of an eye are different, the virtual display content to the fundus.

In a possible implementation manner of the embodiment of the present application, a curved optical device such as a curved beam splitter may be needed to implement the function in step S143. However, the virtual display content is generally deformed after passing through the curved optical device. Therefore, in a possible implementation manner of the embodiment of the present application, the projection step S140 further comprises:

S144: Perform, on the virtual display content, counter-deformation processing corresponding to the locations of the pupil when the optical axis directions of the eye are different, to cause that the virtual display content that needs to be presented is received at the fundus. For example, the projected virtual display content is preprocessed to cause the projected virtual display content to have counter-deformation that is reverse to the deformation, and then after passing through the foregoing curved optical device, the counter-deformation effect is offset by a deformation effect of the curved optical device, and therefore, the virtual display content received at the fundus of the user is presented in a required effect.

In a possible implementation manner of the embodiment of the present application, in order to make a size of the virtual display content that the user sees more suitable, the projection step further comprises:

controlling the size of the virtual display content projected to the fundus.

In a possible implementation manner of the embodiment of the present application, the control may be implemented by adjusting the projection imaging parameter in step S142, or in another possible implementation manner, the size of the virtual display content that is to be projected may be controlled before the virtual display content is projected. The control may be automatically performed, or may be performed according to interaction with the user and based on an intention of the user, for example, identified by using a gesture of the user, or adjusted directly by using a key on a device corresponding to the method in the embodiment of the present application, and the like.

Preferably, in a possible implementation manner of the embodiment of the present application, in order to save the energy consumption and avoid occurrence of interactive display that is not needed by the user, coordinated interaction with the coordination device may be triggered by using a specific trigger action, and when the coordinated interaction is not triggered, interaction with the coordination device is not performed; therefore, the method further comprises:

a triggering step: obtaining a trigger signal to trigger interaction with the coordination device, which, for example, may be triggering the location obtaining step and the display information obtaining step.

According to the method in the embodiment of the present application, virtual display content corresponding to a coordination device is projected to a fundus of a user, to cause that the user sees the virtual display content near the coordination device, which facilitates interaction between the user and the coordination device, and improves the user experience.

Figure 4:
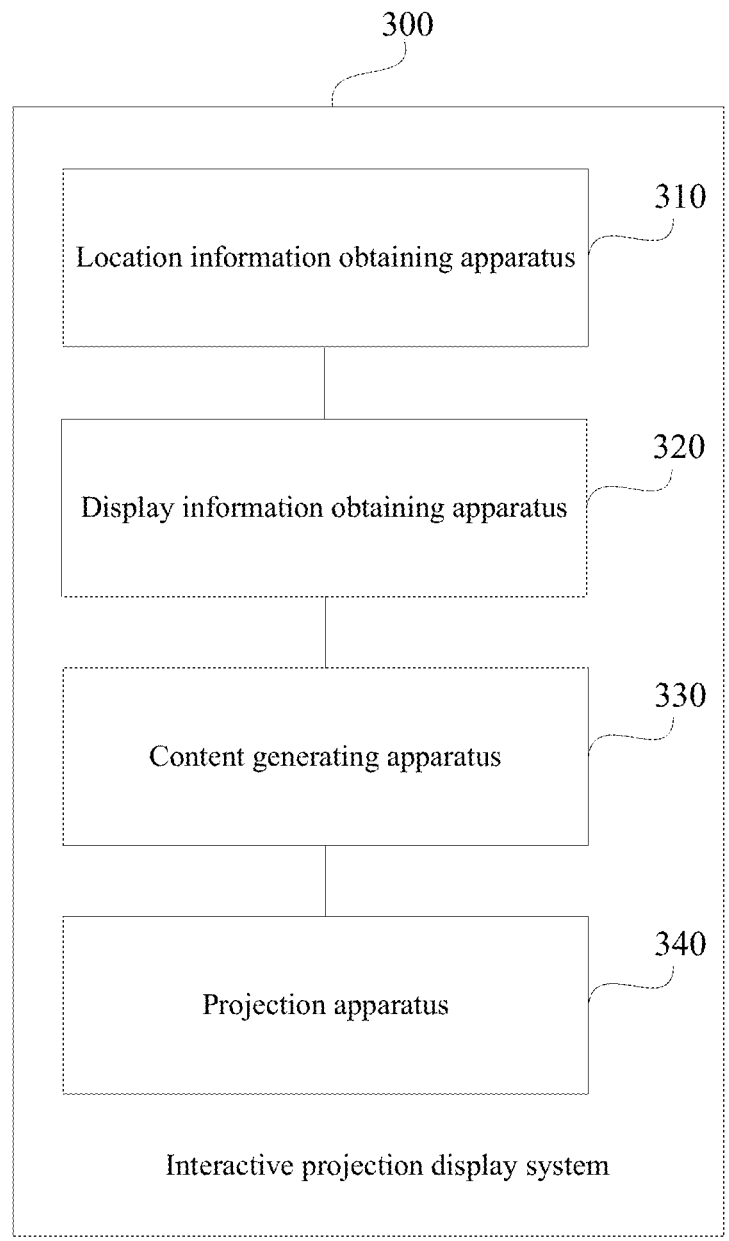
FIG. 4 is a schematic structural block diagram of an interactive projection display system according to an embodiment of the present application.

As shown in FIG. 4, an embodiment of the present application further provides an interactive projection display system 300, comprising:

a location information obtaining apparatus 310, configured to obtain current to-be-displayed location information corresponding to a coordination device;

a display information obtaining apparatus 320, configured to obtain current display information corresponding to the coordination device;

a content generating apparatus 330, configured to generate, according to the display information, current virtual display content corresponding to the coordination device; and a projection apparatus 340, configured to project the virtual display content to a corresponding location at a fundus of a user according to the to-be-displayed location information.

The system in the embodiment of the present application projects the virtual display content corresponding to the coordination device to the fundus of the user according to a to-be-displayed location, to cause that the virtual display content that the user sees is imaged at the to-be-displayed location, a sight line does not need to switch back and forth between a display device and the coordination device substantially when the user interacts with the coordination device by using the virtual display content displayed at the to-be-displayed location, which more conforms to a use habit of the user and improves the user experience.

In a possible implementation manner of the embodiment of the present application, the coordination device preferably is a wearable device, and more preferably is a wearable device having a weak display capability, such as a smart watch, a smart ring, a smart band, or a smart necklace. Certainly, those skilled in the art may know that, the present application may be further applied to another portable device or a fixed device that has a weak display capability, or applied to a scenario in which the coordination device has a display capability but the display capability needs to be enhanced.

In a possible implementation manner of the embodiment of the present application, the interactive projection display system may be a wearable device used near an eye, which may be separately implemented, or may be implemented on an existing device, for example, may be an apparatus near the eye, such as smart glasses (comprising: frame glasses, contact lenses, safety goggles, and the like). For a user that already has an eye problem such as a refractive error and needs to wear glasses for correction of the refractive error, or the like, the system in the present application may be directly implemented on the glasses for correction of the refractive error, and does not bring extra burden to the user. Certainly, in another possible implementation manner of the embodiment of the present application, the interactive projection display system may be implemented on, for example, helmet eyepieces or another optical device that is used in coordination with an eye of the user.

There may be multiple forms of the location information obtaining apparatus 310 in the embodiment of the present application, which, for example, comprise at least one of the following multiple forms:

1) The location information obtaining apparatus 310 comprises:
   a device location obtaining module, configured to obtain current device location information of the coordination device; and
   a to-be-displayed location determining module, configured to determine the current to-be-displayed location information according to the current device location information of the coordination device.

2) The location information obtaining apparatus 310 comprises:
   an interaction obtaining module, configured to obtain the current to-be-displayed location information through interaction with the user.

For example, a gesture and a location of a hand of the user are obtained by using a detection sensor, to obtain a current to-be-displayed location set by the hand of the user (for example, the user draws a block by hand, and a region corresponding to the block is the current to-be-displayed location needed by the user), or the to-be-displayed location information may be input manually by the user (for example, data such as a distance between the to-be-displayed location and an eye of the user, an angle, and a size of the to-be-displayed location is input).

In the foregoing method 1), there are multiple structures of the device location obtaining module, which, for example, comprise at least one of the following several structures:

a) The device location obtaining module comprises:
   a communications submodule, configured to receive the current device location information of the coordination device.

In a possible implementation manner of the embodiment of the present application, the communications submodule may receive the current device location information of the coordination device from the coordination device. That is, the coordination device obtains and sends the current device location information of the coordination device, and then, the communications submodule in the method embodiment receives the location information. The coordination device, for example, may obtain a location of the coordination device by using a location sensor such as a positioning module (for example, a global positioning system or indoor positioning).

In another possible implementation manner of the embodiment of the present application, the communications submodule may also receive the current device location information of the coordination device from another external device. Herein, the another external device may be another portable or wearable device, for example, a mobile phone with strong processing performance; or the another external device may be a device such as a remote server (for example, a cloud server). The coordination device transfers the current device location information of the coordination device to the another external device, then, the another external device forwards the information, and then, the communications submodule in the embodiment of the present application receives the current device location information of the coordination device. In addition, in another possible implementation manner of the embodiment of the present application, the another external device may obtain, by itself, the current device location information of the coordination device, and then, forward the information to be received by the communications submodule in the embodiment of the present application, and for example, the another external device may be an external positioning apparatus.

b) The device location obtaining module comprises:
   a detection submodule, configured to detect the current device location information of the coordination device.

Preferably, in a possible implementation manner of the embodiment of the present application, the detection submodule comprises:
   a gaze point detection unit, configured to detect a location of a current gaze point of the user; and
   a device location determining unit, configured to determine the current device location information of the coordination device according to the location of the gaze point.

For example, in a possible implementation manner of the embodiment of the present application, the system in the present application may obtain, in a manner of interacting with the user, information that the user is currently gazing at the coordination device; in this case, after the location of the current gaze point of the user is detected, the location of the gaze point is the current device location information of the coordination device.

In another possible implementation manner of the embodiment of the present application, the system in the present application may determine an object corresponding to the location of the gaze point, and determine the current device location information of the coordination device when determining that the object is the coordination device.

In another possible implementation manner of the embodiment of the present application, the detection submodule comprises:
   an interaction detection unit, configured to detect interaction information of the user; and
   a device location determining unit, configured to determine the current device location information of the coordination device according to the interaction information of the user.

The interaction detection unit, for example, may be an input signal detection device; the interaction information of the user may be the current device location information of the coordination device that is manually input by the user; the device location determining unit, for example, may be an input signal analysis device, configured to obtain the current device location information of the coordination device according to the input.

The interaction detection unit, for example, may also be an image acquisition apparatus, for example, a camera, and the device location determining unit, for example, may be an image processing apparatus, configured to analyze an image acquired by the image acquisition apparatus, to determine the current device location information of the coordination device. The embodiment of the present application can detect interaction information related to a current location of the coordination device by identifying an action or a gesture of the user, and determine the current device location information of the coordination device according to the interaction information.

c) The device location obtaining module comprises:
   a local obtaining submodule, configured to obtain locally stored location related information of the coordination device.

By using that the coordination device is a smart watch as an example, for example, a relative location relationship, (for example, a distance between the smart watch and an eye, and an angle), between the smart watch and an eye of the user when the user normally looks at the smart watch and needs to interact with the smart watch, is obtained according to a feature of the user, for example, a shape feature or a use habit feature (the watch is worn at which wrist, a location of the watch on the wrist, amplitudes of lifting and bending a shoulder and an elbow when the user looks at the watch, and the like), and then, obtained data is locally stored, and the location related information is obtained locally and directly.

Certainly, those skilled in the art may know that, another apparatus that can obtain a location of the coordination device may also be used in the method in the embodiment of the present application.

A manner of detecting, by the gaze point detection unit in the item b), a location of a focal point of a sight line of an observer may be any one or more in i) to iii) mentioned in the method embodiment shown in FIG. 1. In the system in the embodiment of the present application, the manner iii) with higher detection precision is used, and correspondingly, the gaze point detection unit may be any one of gaze point detection apparatuses shown in the following FIG. 5a to FIG. 5d, FIG. 6, and FIG. 7.

Certainly, those skilled in the art may know that, in addition to the foregoing several gaze point detection units, another apparatus that can be used to detect the gaze point of the eye of the user can also be used in the system in the embodiment of the present application.

Preferably, in a possible implementation manner of the embodiment of the present application, the to-be-displayed location determining module is configured to determine the current to-be-displayed location information according to the current device location information of the coordination device and a preset rule. The preset rule herein, for example, may be that the to-be-displayed location is located above, below, at a left side of, at a right side of, surrounding the current location of the coordination device, or the like; or after ambient environment information of the coordination device is obtained by using a sensor (for example, an image acquisition sensor), the to-be-displayed location information may be determined according to the preset rule and the environment information.

In the embodiment of the present application, the current display information corresponds to an operation of the user on the coordination device, for example, if the user enters a number on the coordination device by using a key, the current display information comprises information corresponding to the entered number, and then, when the current display information is displayed, entering of the number is displayed. There may be multiple forms of the display information obtaining apparatus 320, which, for example, are one or more of the following:

1) The display information obtaining apparatus 320 comprises:
a communications module, configured to obtain the current display information corresponding to the coordination device from the coordination device.

2) The display information obtaining apparatus 320 comprises:
a communications module, configured to obtain the current display information corresponding to the coordination device from another external device.

3) The display information obtaining apparatus 320 comprises:
a communications module, configured to obtain information corresponding to a current state and an operation of the coordination device; and a processing module, configured to obtain corresponding current display information locally after processing the corresponding information.

For the three specific implementation manners of the display information obtaining apparatus 320, refer to corresponding descriptions in step S120 in the method embodiment, which are not described in detail herein again. In addition, functions of the communications modules in the foregoing three implementation manners and the communications submodule recorded in the location information obtaining apparatus 310 may be implemented by a same device.

In order to enable the virtual display content projected in the projection step to have an effect of more conforming to the visual sense of the user from the user's perspective, in a possible implementation manner of the embodiment of the present application, the content generating apparatus 330 generates the virtual display content according to the to-be-displayed location information and the display information. The to-be-displayed location information is also considered when the virtual display content is generated. For example, in a possible implementation manner of the embodiment of the present application, the content generating apparatus 330 generates the virtual display content that comprises perspective information corresponding to the current to-be-displayed location. The perspective information, for example, may comprise depth information, perspective angle information, and the like.

In order to make the virtual display content that the user sees have a three-dimensional display effect and be more real, in a possible implementation manner of the embodiment of the present application, the content generating apparatus 330 generates virtual display content separately corresponding to two eyes of the user. For a specific implementation method, refer to corresponding descriptions in the method embodiment, which is not described in detail herein again.

In a possible implementation manner of the embodiment of the present application, the projection apparatus 340 comprises:
a projection module, configured to project the virtual display content to the fundus; and
an imaging adjustment module, configured to adjust a projection imaging parameter of an optical path between the projection module and the fundus according to the current to-be-displayed location information.

In another possible implementation manner of the embodiment of the present application, the imaging adjustment module comprises:
an adjustable lens device, an imaging parameter of the adjustable lens device being adjustable and/or a location of the adjustable lens device on the optical path between the projection module and the fundus being adjustable. For a specific implementation method, refer to corresponding descriptions in the method embodiment, which is not described in detail herein again.

In another possible implementation manner of the embodiment of the present application, the imaging adjustment module comprises:
a curved beam splitting unit, configured to project, separately corresponding to locations of a pupil when optical axis directions of an eye are different, the virtual display content to the fundus. For a specific implementation method, refer to corresponding descriptions in the method embodiment, which is not described in detail herein again.

In a possible implementation manner of the embodiment of the present application, the projection apparatus comprises:

a counter-deformation processing module, configured to perform, on the virtual display content, counter-deformation processing corresponding to the locations of the pupil when the optical axis directions of the eye are different, to cause that the virtual display content that needs to be presented is received at the fundus. For a specific implementation method, refer to corresponding descriptions in the method embodiment, which is not described in detail herein again.

In a possible implementation manner of the embodiment of the present application, the projection apparatus comprises:

a projection control module, configured to control a size of the virtual display content projected to the fundus. For a specific implementation method, refer to corresponding descriptions in the method embodiment, which is not described in detail herein again.

There are some records about the structure of the projection apparatus in implementation manners shown in the following FIG. 6 to FIG. 8.

In a possible implementation manner of the embodiment of the present application, the system further comprises:

a triggering apparatus, configured to obtain a trigger signal and trigger the location obtaining apparatus and the display information obtaining apparatus. For a specific implementation method, refer to corresponding descriptions in the method embodiment, which is not described in detail herein again.

In a possible implementation manner of the embodiment of the present application, the gaze point detection unit comprises:

an image acquisition subunit, configured to acquire an image at the fundus of the user;

an adjustable imaging subunit, configured to adjust an imaging parameter of an optical path between the image acquisition subunit and an eye until a clearest image is acquired; and an image processing subunit, configured to analyze the acquired image to obtain the imaging parameter of the optical path between the image acquisition subunit and the eye and an optical parameter of the eye, wherein the imaging parameter and the optical parameter correspond to the clearest image; and calculate a location of the gaze point of the user relative to the user.

The following further describes, by using implementation manners corresponding to FIG. 5a to FIG. 5d, FIG. 6, and FIG. 7, the gaze point detection apparatus that is used as the gaze point detection unit.

Figure 5A:
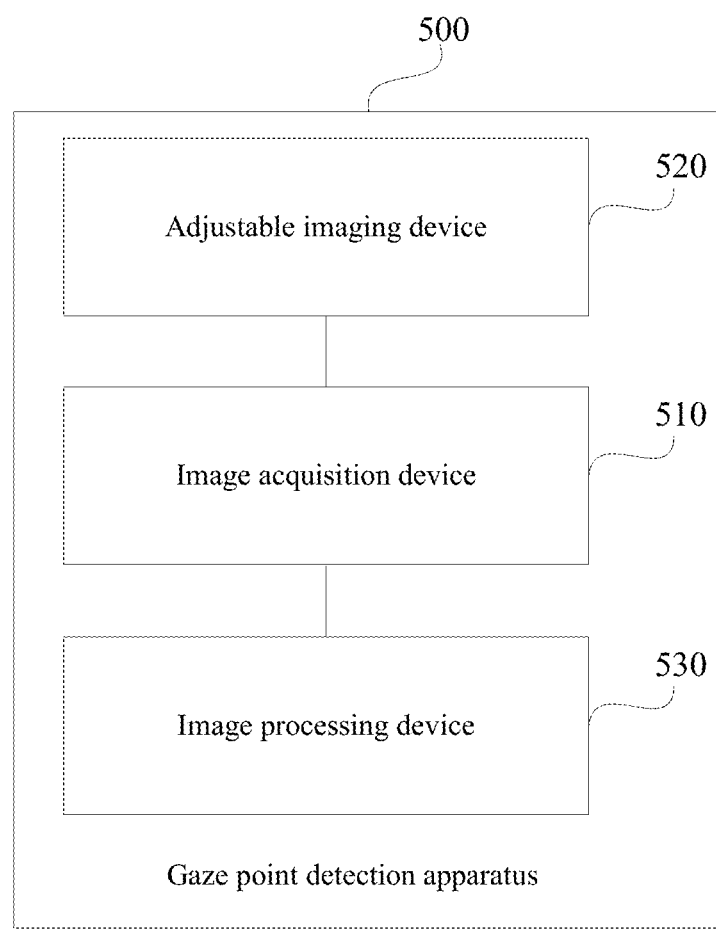
FIG. 5a is a schematic structural block diagram of a gaze point detection apparatus according to an embodiment of the present application.

As shown in FIG. 5a, in a possible implementation manner of the embodiment of the present application, the gaze point detection apparatus 500 comprises:

an image acquisition device 510, configured to acquire an image presented at a fundus of the eye;

an adjustable imaging device 520, configured to adjust an imaging parameter of an optical path between the image acquisition device and the eye, to cause the image acquisition device to obtain a clearest image; and an image processing device 530, configured to analyze the image obtained by the image acquisition device, to obtain an imaging parameter of the optical path between the image acquisition device and the eye and an optical parameter of the eye when the clearest image is obtained, and calculate a location of a gaze point of the eye.

The gaze point detection apparatus 500 analyzes and processes the image at the fundus of the eye, to obtain the optical parameter of the eye when the image acquisition device obtains the clearest image, and can obtain through calculation a location of a current gaze point of the eye, which provides a basis for further implementing a self-adaptive operation of the eye.

The image presented at the "fundus" herein mainly is an image presented on a retina, which may be an image of the fundus, or an image of another object projected to the fundus. The eye herein may be a human eye or may be an eye of another animal.

Figure 5B:
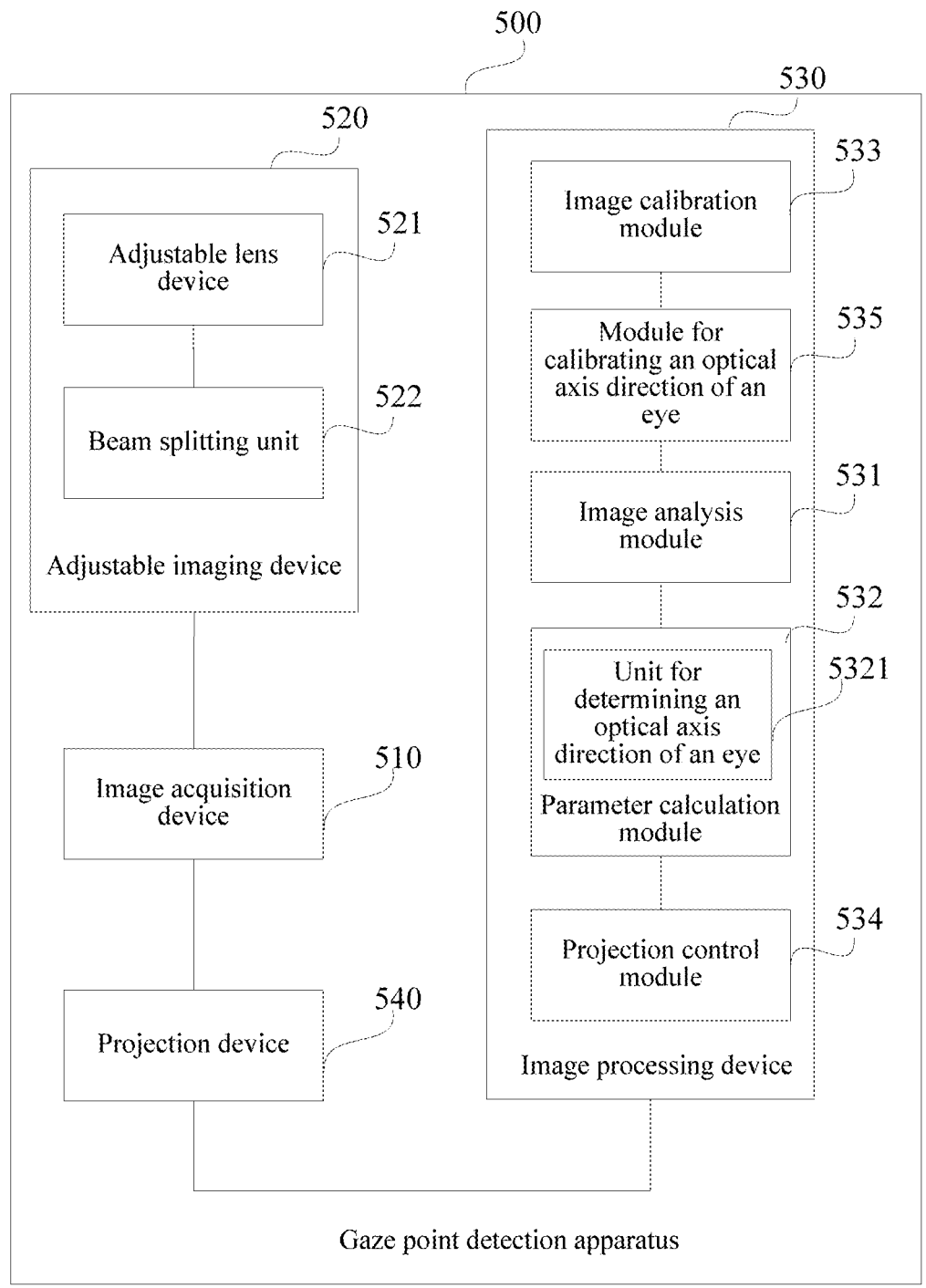
FIG. 5b is a schematic structural block diagram of another gaze point detection apparatus according to an embodiment of the present application.

As shown in FIG. 5b, in a possible implementation manner of the embodiment of the present application, the image acquisition device 510 is a micro camera, and in another possible implementation manner of the embodiment of the present application, the image acquisition device 510 may further directly use a sensitive imaging device, such as a CCD or a CMOS device.

In a possible implementation manner of the embodiment of the present application, the adjustable imaging device 520 comprises: an adjustable lens device 521, located on the optical path between the eye and the image acquisition device 510, a focal length of the adjustable lens device being adjustable and/or a location of the adjustable lens device on the optical path being adjustable. By using the adjustable lens device 521, a system equivalent focal length between the eye and the image acquisition device 510 is adjustable, and the image acquisition device 510 obtains the clearest image at the fundus at a certain location of the adjustable lens device 521 or in a certain state though adjustment of the adjustable lens device 521. In this implementation manner, the adjustable lens device 521 performs the adjustment continuously and in real time in the detection process.

Preferably, in a possible implementation manner of the embodiment of the present application, the adjustable lens device 521 is a focal length adjustable lens, configured to adjust a focal length of the focal length adjustable lens by adjusting a refractive index and/or a shape of the focal length adjustable lens. Specifically: 1) The focal length is adjusted by adjusting curvature of at least one surface of the focal length adjustable lens, for example, the curvature of the focal length adjustable lens is adjusted by increasing or decreasing a liquid medium in a cavity formed by a two-layer transparent layer; and 2) the focal length is adjusted by changing the refractive index of the focal length adjustable lens, for example, the focal length adjustable lens is filled with a specific liquid crystal medium, an arrangement of the liquid crystal medium is adjusted by adjusting a voltage of an electrode corresponding to the liquid crystal medium, and therefore, the refractive index of the focal length adjustable lens is changed.

In another possible implementation manner of the embodiment of the present application, the adjustable lens device 521 may comprise a group of lenses formed by multiple lenses, configured to adjust a focal length of the group of lenses by adjusting relative locations between the lenses in the group of lenses. The group of lenses may also comprise a lens whose imaging parameter such as a focal length is adjustable.

In addition to the foregoing two manners of changing an optical path parameter of a system by using a feature of the adjustable lens device 521, the optical path parameter of the system may also be changed by using the location of the adjustable lens device 521 on the optical path.

Preferably, in a possible implementation manner of the embodiment of the present application, in order not to affect the viewing experience of the user for an observed object, and in order to make the system be portably applied to a wearable device, the adjustable imaging device 520 further comprises: a beam splitting unit 522, configured to form an optical transfer path between the eye and the observed object, and an optical transfer path between the eye and the image acquisition device 510. In this way, the optical path can be folded, a size of the system is reduced, and at the same time, other visual experience of the user is not affected as far as possible.

Preferably, in this implementation manner, the beam splitting unit comprises: a first beam splitting unit, located between the eye and the observed object, and configured to transmit light from the observed object to the eye, and transfer light from the eye to the image acquisition device.

The first beam splitting unit may be a beam splitter, a beam splitting optical waveguide (comprising an optical fiber), or another suitable splitting device.

In a possible implementation manner of the embodiment of the present application, the image processing device 530 in the system comprises an optical path calibration module, configured to calibrate an optical path of the system, for example, perform alignment and calibration on an optical axis of the optical path, to ensure the precision of measurement.

In a possible implementation manner of the embodiment of the present application, the image processing device 530 comprises:

an image analysis module 531, configured to analyze the image obtained by the image acquisition device, to find the clearest image; and a parameter calculation module 532, configured to calculate an optical parameter of the eye according to the clearest image, and an imaging parameter that is known to the system when the clearest image is obtained.

In this implementation manner, the adjustable imaging device 520 causes the image acquisition device 510 to obtain the clearest image. However, the clearest image needs to be found by using the image analysis module 531. In this case, the optical parameter of the eye can be obtained through calculation according to the clearest image and the optical path parameter that is known to the system. Herein, the optical parameter of the eye may comprise an optical axis direction of the eye.

In a possible implementation manner of the embodiment of the present application, preferably, the system further comprises: a projection device 540, configured to project a light spot to the fundus. In a possible implementation manner, a micro projector may be used to implement the function of the projection device.

The projected light spot herein may have no specific pattern and is only be used to illuminate the fundus.

In an exemplary implementation manner of the embodiment of the present application, the projected light spot comprises a pattern with abundant features. The abundant features of the pattern may facilitate detection and improve the detection precision. FIG. 2 shows an example of a light spot pattern 200. The pattern may be formed by a light spot pattern generator, such as frosted glass. FIG. 3 shows an image shot at the fundus when the light spot pattern 200 is projected.

In order not to affect normal viewing of the eye, preferably, the light spot is an eye-invisible infrared light spot.

In this case, in order to reduce interference from other spectrums:

an eye-invisible light transmission lens may be disposed on an exit surface of the projection device; and an eye-invisible light transmission lens is disposed on an incident surface of the image acquisition device.

Preferably, in a possible implementation manner of the embodiment of the present application, the image processing device 530 further comprises:

a projection control module 534, configured to control, according to a result obtained by the image analysis module, luminance of the light spot projected by the projection device.

For example, the projection control module 534 may adjust the luminance self-adaptively according to a feature of the image obtained by the image acquisition device 510. Herein, the feature of the image comprises a contrast of the feature of the image, a texture feature, and the like.

Herein, a special case of controlling the luminance of the light spot projected by the projection device is turning on or turning off the projection device. For example, when the user keeps gazing at a point, the projection device may be turned off periodically; or when the fundus of the user is bright enough, a light source may be turned off, and a distance between a gaze point of a current sight line of an eye and the eye may be detected by only using fundus information.

In addition, the projection control module 534 may further control, according to ambient light, the luminance of the light spot projected by the projection device.

Preferably, in a possible implementation manner of the embodiment of the present application, the image processing device 530 further comprises: an image calibration module 533, configured to calibrate a fundus image, to obtain at least one reference image corresponding to the image presented at the fundus.

The image analysis module 531 performs comparative calculation on the image obtained by the image acquisition device 530 and the reference image, to obtain the clearest image. Herein, the clearest image may be an obtained image that is the least different from the reference image. In this implementation manner, a difference between a currently obtained image and the reference image is calculated by using an existing image processing algorithm, for example, by using a classic automatic phase difference focusing algorithm.

Preferably, in a possible implementation manner of the embodiment of the present application, the parameter calculation module 532 comprises:

a unit 5321 for determining an optical axis direction of an eye, configured to obtain an optical axis direction of the eye according to a feature of the eye when the clearest image is obtained.

The feature of the eye herein may be obtained from the clearest image, or may be obtained in another manner. The optical axis direction of the eye indicates a direction of a sight line at which the eye gazes.

Preferably, in a possible implementation manner of the embodiment of the present application, the unit 5321 for determining an optical axis direction of an eye comprises: a first determining subunit, configured to obtain the optical axis direction of the eye according to a feature of the fundus when the clearest image is obtained. Compared with obtaining the optical axis direction of the eye by using features of a pupil and an eyeball surface, determining the optical axis direction of the eye by using the feature of the fundus has a higher accuracy.

When the light spot pattern is projected to the fundus, a size of the light spot pattern may be greater than that of a fundus visible region or may be less than that of the fundus visible region.

When an area of the light spot pattern is less than or equal to that of the fundus visible region, a classic feature point matching algorithm (for example, the SIFT algorithm) may be used to determine the optical axis direction of the eye by detecting a location, of the light spot pattern on the image, relative to the fundus.

When the area of the light spot pattern is greater than or equal to that of the fundus visible region, a location, of the light spot pattern on the obtained image, relative to an original light spot pattern (obtained by using the image calibration module) may be used to determine the optical axis direction of the eye to determine a direction of a sight line of the user.

In another possible implementation manner of the embodiment of the present application, the unit 5321 for determining an optical axis direction of an eye comprises: a second determining subunit, configured to obtain the optical axis direction of the eye according to a feature of a pupil of the eye when the clearest image is obtained. The feature of the pupil of the eye herein may be obtained from the clearest image, or may be obtained in another manner. Obtaining the optical axis direction of the eye by using the feature of the pupil of the eye is the prior art, and is not described in detail herein again.

Preferably, in a possible implementation manner of the embodiment of the present application, the image processing device 530 further comprises: a module 535 for calibrating an optical axis direction of an eye, configured to calibrate the optical axis direction of the eye, so as to more accurately determine the foregoing optical axis direction of the eye.

In this implementation manner, the imaging parameter that is known to the system comprises a fixed imaging parameter and a real-time imaging parameter, wherein the real-time imaging parameter is parameter information of the adjustable lens device when the clearest image is acquired, and the parameter information may be obtained in a manner of real-time recording when the clearest image is acquired.

Figure 5C:
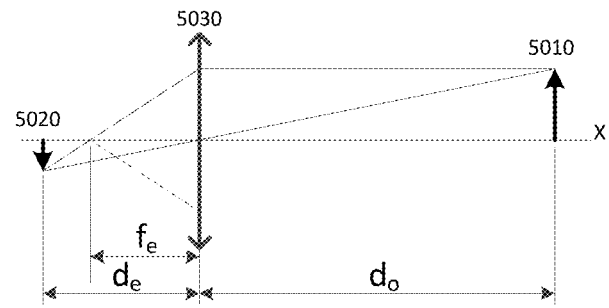
FIG. 5c is a schematic diagram of an optical path of eye imaging of a gaze point detection apparatus according to an embodiment of the present application.

The distance between the gaze point of the eye and the eye is obtained through calculation below after a current optical parameter of the eye is obtained, specifically:

FIG. 5c is a schematic diagram of eye imaging, and with reference to a lens imaging formula in a classic optical theory, a formula (1) may be obtained from FIG. 5c:

$$\frac{1}{d_o} + \frac{1}{d_e} = \frac{1}{f_e} \tag{1}$$

$d_o$ and $d_e$ are a distance between a currently observed object 5010 of the eye and an eye equivalent lens 5030 and a distance between a real image 5020 on the retina and the eye equivalent lens 5030, respectively, $f_e$ is an equivalent focal length of the eye equivalent lens 5030, and X is a direction of the sight line of the eye (which may be obtained by using the optical axis direction of the eye).

Figure 5D:
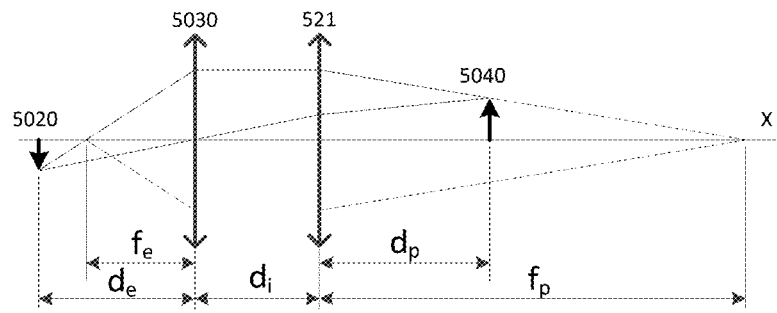
FIG. 5d is a schematic diagram of obtaining, by a gaze point detection apparatus, a location of a gaze point of an eye according to an imaging parameter known to a system and an optical parameter of the eye according to an embodiment of the present application.

FIG. 5d is a schematic diagram of a distance, between a gaze point of an eye and the eye, that is obtained according to an optical parameter known to a system and an optical parameter of the eye. In FIG. 5d, a light spot 5040 forms a virtual image (not shown in FIG. 5d) by using an adjustable lens device 521. Assuming that a distance between the virtual image and the lens is x (not shown in FIG. 5d), the following equation set may be obtained with reference to the formula (1):

$$\begin{cases} \frac{1}{d_p} - \frac{1}{x} = \frac{1}{f_p} \\ \frac{1}{d_i + x} + \frac{1}{d_e} = \frac{1}{f_e} \end{cases} \tag{2}$$

$d_p$ is an optical equivalent distance between the light spot 5040 and the adjustable lens device 521, $d_i$ is an optical equivalent distance between the adjustable lens device 521 and the eye equivalent lens 5030, $f_p$ is a focal length value of the adjustable lens device 521.

As shown in a formula (3), a distance $d_o$ between the currently observed object 5010 (the gaze point of the eye) and the eye equivalent lens 5030 may be obtained from (1) and (2):

$$d_o = d_i + \frac{d_p \cdot f_p}{f_p - d_p} \tag{3}$$

The optical axis direction of the eye may be obtained because of previous records and according to the foregoing distance, between the observed object 5010 and the eye, that is obtained through calculation, and therefore, the location of gaze point of the eye can be easily obtained, which provides a basis for subsequent further interaction related to the eye.

Figure 6:
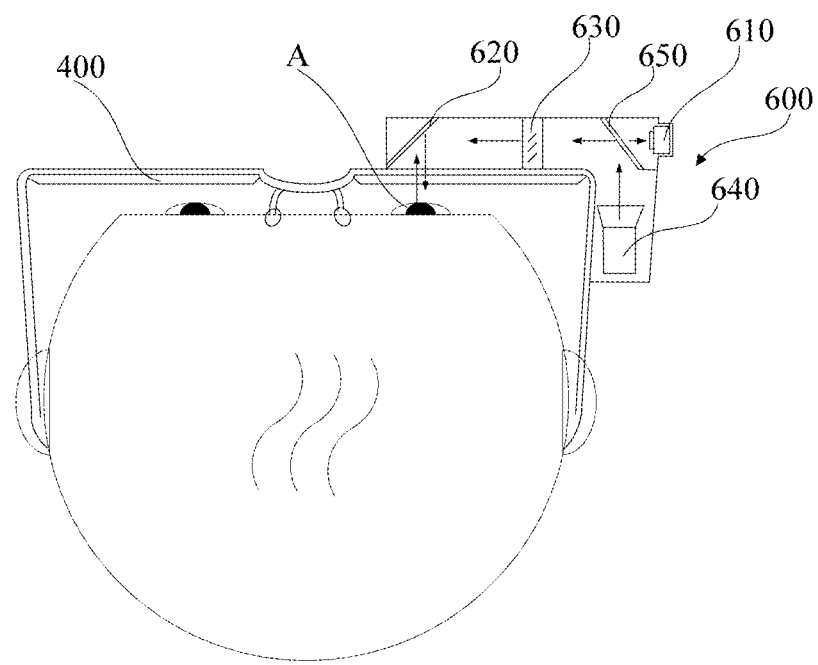
FIG. 6 is a schematic diagram of applying an interactive projection display system to glasses according to an embodiment of the present application.

FIG. 6 is an embodiment of an apparatus 600 for detecting a gaze point of an eye, which is applied to glasses 400 according to a possible implementation manner in the embodiment of the present application, and comprises content recorded in the implementation manner shown in FIG. 5b. Specifically, as can be seen from FIG. 6, in this implementation manner, an apparatus 600 in this implementation manner is integrated at a right side of the glasses 400 (which is not limited thereto), and comprises:

a micro camera 610, having a same function as the image acquisition device recorded in the implementation manner in FIG. 5b, wherein, in order not to affect a sight line of a user for normally viewing an object, the micro camera 610 is disposed at an outer right side of the glasses 400;

a first beam splitter 620, having a same function as the first beam splitting unit recorded in the implementation manner in FIG. 5b, disposed with a certain tilt angle at an intersection point of a gaze direction of an eye A and an incident direction of the camera 610, and transmitting light entering the eye A from an observed object and reflecting light from the eye to the camera 610; and a focal length adjustable lens 630, having a same function as the focal length adjustable lens recorded in the implementation manner in FIG. 5b, located between the first beam splitter 620 and the camera 610, and adjusting a focal length value in real time, to cause the camera 610 to shoot, at a certain focal length value, a clearest image at a fundus.

In this implementation manner, the image processing device is not shown in FIG. 6, and a function of the image processing device is the same as that of the image processing device shown in FIG. 5b.

Generally, the fundus is not bright enough, and therefore, it is better to illuminate the fundus, and in this implementation manner, the fundus is illuminated by using a light source 640. In order not to affect the user experience, the light source 640 herein preferably is eye-invisible light, preferably, is a near-infrared light source which does not much affect the eye A and to which the camera 610 is relatively sensitive.

In this implementation manner, the light source 640 is located at an outer side of a spectacle frame at a right side, and therefore, a second beam splitter 650 and the first beam splitter 620 are required to jointly transfer, to the fundus, light emitted by the light source 640. In this implementation manner, the second beam splitter 650 is located in front of an incident surface of the camera 610, and therefore, light from the fundus to the second beam splitter 650 also needs to be transmitted.

As can be seen, in this implementation manner, in order to improve the user experience and the acquisition clarity of the camera 610, the first beam splitter 620 may preferably have the features of high reflectivity to infrared rays and high transmissivity to visible light. For example, an infrared reflective film may be disposed at one side, of the first beam splitter 620, facing the eye A, to achieve the features described above.

As can be seen from FIG. 6, in this implementation manner, the apparatus 600 for detecting a gaze point of an eye is located at one side, of a lens of the glasses 400, away from the eye A, and therefore, the lens may also be considered as a part of the eye A during calculation of an optical parameter of the eye; in this case, there is no need to know an optical feature of the lens.

In another implementation manner of the embodiment of the present application, the apparatus 600 for detecting a gaze point of an eye may be located at one side, of a lens of the glasses 400, close to the eye A; in this case, an optical feature parameter of the lens needs to be obtained in advance, and an influence factor of the lens needs to be considered when the distance of the gaze point is calculated.

In this embodiment, the light emitted by the light source 640 is reflected by the second beam splitter 650, projected by the focal length adjustable lens 630, and reflected by the first beam splitter 620, and then passes through the lens of the glasses 400 to enter the eye of the user, and finally arrives at a retina of the fundus. The camera 610 shoots an image at the fundus by using a pupil of the eye A and through an optical path formed by the first beam splitter 620, the focal length adjustable lens 630, and the second beam splitter 650.

In a possible implementation manner, other parts of the interactive projection display system in the embodiment of the present application are also implemented on the glasses 400, and both the gaze point detection unit and the projection apparatus may comprise: a device having a projection function (such as the projection module in the foregoing projection apparatus, and the projection device of the gaze point detection apparatus), an imaging device with an imaging parameter being adjustable (such as the imaging adjustment module in the foregoing projection apparatus, and the adjustable imaging device in the gaze point detection apparatus), and the like; in a possible implementation manner of the embodiment of the present application, functions of the gaze point detection apparatus and the projection apparatus are implemented by a same device.

As shown in FIG. 6, in a possible implementation manner of the embodiment of the present application, in addition to being configured to illuminate the gaze point detection apparatus, the light source 640 may be further configured to assist in projecting the virtual display content, as a light source of the projection device of the projection apparatus. In a possible implementation manner, the light source 640 may separately project invisible light to illuminate the gaze point detection apparatus, and visible light to assist in projecting the virtual display content. In another possible implementation manner, the light source 640 may further switch the invisible light and the visible light in a time division manner. In still another possible implementation manner, the gaze point detection apparatus may use the virtual display content to complete the function of illuminating the fundus.

In a possible implementation manner of the embodiment of the present application, in addition to functioning as imaging adjustment modules of the projection apparatus, the first beam splitter 620, the second beam splitter 650, and the focal length adjustable lens 630 may further function as adjustable imaging devices of the gaze point detection apparatus. Herein, in a possible implementation manner, a focal length of the focal length adjustable lens 630 may be adjusted according to regions, wherein different regions separately correspond to the gaze point detection apparatus and the projection apparatus, and focal lengths may also be different. Alternatively, a focal length of the focal length adjustable lens 630 is adjusted as a whole. However, a front end of a light sensitive unit (such as a CCD) of the micro camera 610 of the gaze point detection apparatus is further provided with another optical device, configured to implement assisted adjustment of the imaging parameter of the gaze point detection apparatus. In addition, in another possible implementation manner, it may be configured that an optical length from a light emitting surface (that is, a projection location of the virtual display content) of the light source 640 to the eye to is the same as an optical length from the eye to the micro camera 610, and when the focal length adjustable lens 630 is adjusted until the micro camera 610 receives the clearest fundus image, the virtual display content projected by the light source 640 is exactly imaged at the fundus clearly.

As can be seen from the above, in the embodiment of the present application, functions of the apparatus for detecting a gaze point of an eye and the projection apparatus in the interactive projection display system may be implemented by using a same device, to cause the whole system to have a simple structure and a small size, and be carried conveniently.

Figure 7:
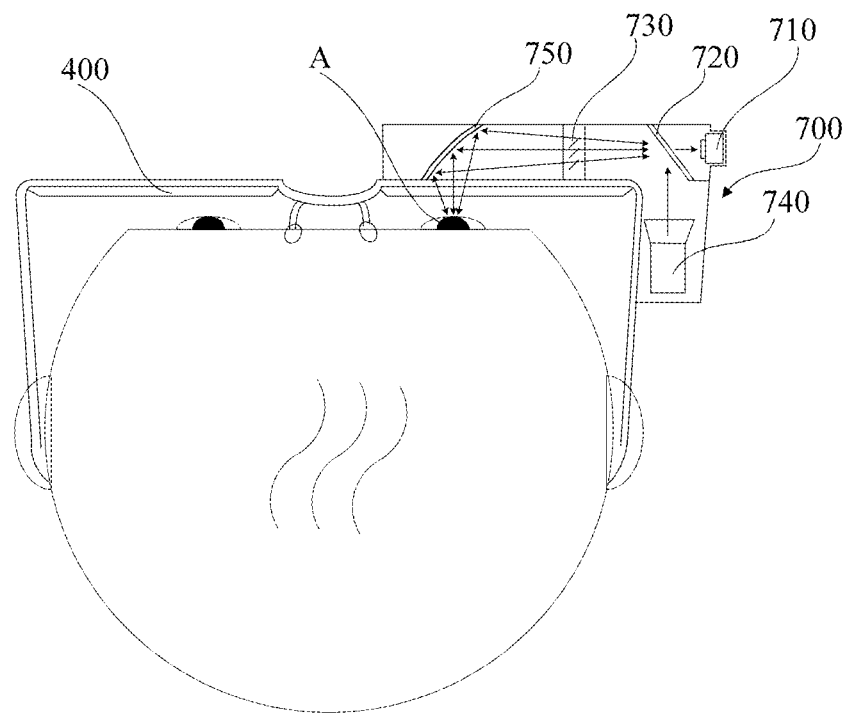
FIG. 7 is a schematic diagram of applying another interactive projection display system to glasses according to an embodiment of the present application.

FIG. 7 is a schematic structural diagram of an apparatus 700 for detecting a gaze point of an eye according to another implementation manner in the embodiment of the present application. As can be seen from FIG. 7, this implementation manner is similar to the implementation manner shown in FIG. 6, comprising a micro camera 710, a second beam splitter 720, and a focal length adjustable lens 730. Differences lie in that, in this implementation manner, a projection device 740 is a projection device 740 for projecting a light spot pattern, and the first beam splitter in the implementation manner in FIG. 6 is replaced with a curved beam splitter 750 as a curved beam splitting device.

The curved beam splitter 750 is used herein to transfer, separately corresponding to locations of a pupil when optical axis directions of an eye are different, an image presented at a fundus to an image acquisition device. In this way, the camera can shoot a mixed and superimposed image formed from various angles of an eyeball. However, only a part at the fundus passing through a pupil can be clearly imaged on the camera, and other parts are out of focus and fail to be imaged clearly, and therefore, the imaging of the part at the fundus is not interfered severely, and a feature of the part at the fundus can still be detected. Therefore, compared with the implementation manner shown in FIG. 6, in this implementation manner, an image at the fundus can be well obtained when the eye gazes at different directions, to cause the apparatus for detecting a gaze point of an eye in this implementation manner to be more widely applied with higher detection precision.

In a possible implementation manner of the embodiment of the present application, other parts of the interactive projection display system in the embodiment of the present application are also implemented on the glasses 400. In this implementation manner, the gaze point detection apparatus and the projection apparatus may also be multiplexed. Similar to the embodiment shown in FIG. 6, in this case, the projection device 740 may project a light spot pattern and the virtual display content simultaneously or by switching in a time division manner; or the gaze point detection apparatus detects the projected virtual display content as the light spot pattern. Similar to the embodiment shown in FIG. 6, in a possible implementation manner of the embodiment of the present application, in addition to functioning as imaging adjustment modules of the projection apparatus, the first beam splitter 720, the second beam splitter 750, and the focal length adjustable lens 730 may further function as adjustable imaging devices of the gaze point detection apparatus.

In this case, the second beam splitter 750 is further configured to perform optical path transferring, separately corresponding to locations of a pupil when optical axis directions of an eye are different, between the projection module and the fundus. After passing through the curved second beam splitter 750, the virtual display content projected by the projection device 740 is deformed; therefore, in this implementation manner, the projection apparatus comprises:

a counter-deformation processing module, configured to perform, on the virtual display content, counter-deformation processing corresponding to the curved beam splitting unit, to cause that the virtual display content that needs to be presented is received at the fundus.

Figure 8:
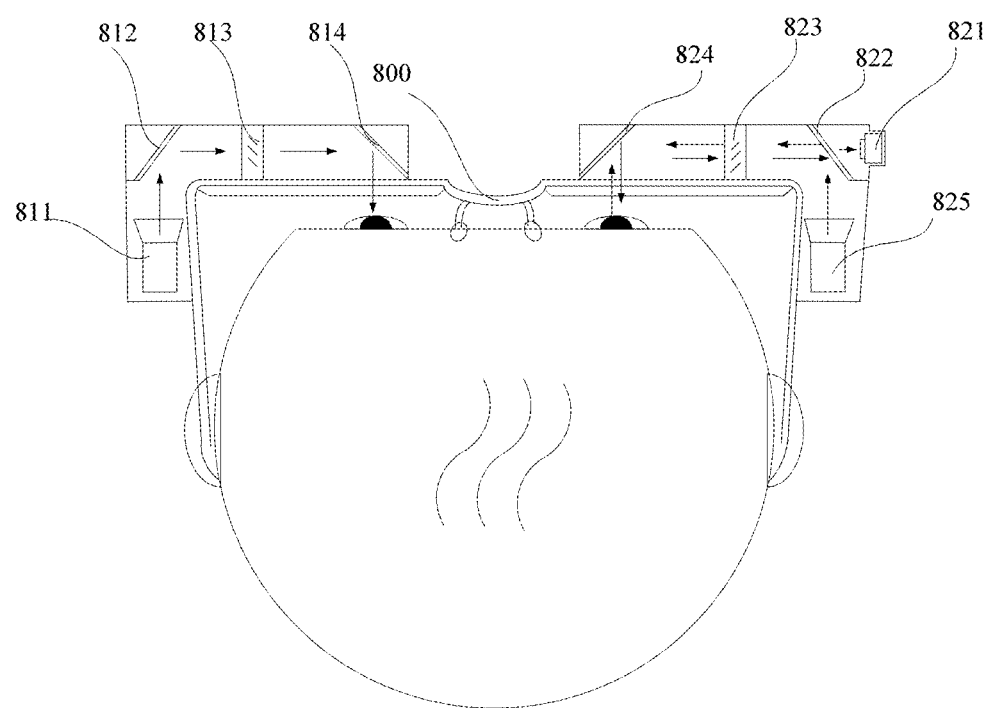
FIG. 8 is a schematic diagram of applying still another interactive projection display system to glasses according to an embodiment of the present application.

As shown in FIG. 8, in a case in which three-dimensional display is required, an interactive projection display system 800 needs to dispose two sets of projection apparatus separately corresponding to two eyes of a user, comprising:

a first projection apparatus corresponding to the left eye of the user; and a second projection apparatus corresponding to the right eye of the user.

A structure of the second projection apparatus is similar to a structure combined with the function of the gaze point detection apparatus and recorded in the embodiment in FIG. 6, and is also a structure that can implement both the function of the gaze point detection apparatus and the function of the projection apparatus, and comprises a micro camera 821, a second beam splitter 822, a second focal length adjustable lens 823, and a first beam splitter 824 (wherein the image processing device of the gaze point detection apparatus and the imaging parameter generating module of the projection apparatus are not shown in FIG. 8) that have same functions as those in the embodiment shown in FIG. 6. A difference lies in that, in this implementation manner, the projection device is a second projection device 825 that can project virtual display content corresponding to the right eye. The projection device may also be configured to detect a location of a gaze point of an eye of the user, and clearly project, to a fundus of the right eye, virtual display content corresponding to the right eye.

A structure of the first projection apparatus is similar to a structure of the second projection apparatus 820 (the imaging parameter generating module of the projection apparatus is not shown in FIG. 8), but the first projection apparatus does not have a micro camera, and is not combined with the function of the gaze point detection apparatus. As shown in FIG. 8, the first projection apparatus comprises:

a first projection device 811, configured to project, to a fundus of the left eye, virtual display content corresponding to the left eye;

a first focal length adjustable lens 813, configured to adjust an imaging parameter between the first projection device 811 and the fundus, to cause that corresponding virtual display content can be clearly presented at the fundus of the left eye, and to cause that the user can see the virtual display content presented at a to-be-displayed location;

a third beam splitter 812, configured to perform optical path transferring between the first projection device 811 and the first focal length adjustable lens 813; and a fourth beam splitter 814, configured to perform optical path transferring between the first focal length adjustable lens 813 and the fundus of the left eye.

By using the method in the embodiment of the present application, content corresponding to the coordination device is presented at the to-be-displayed location in a three-dimensional manner, which brings a better visual effect to the user.

Figure 9:
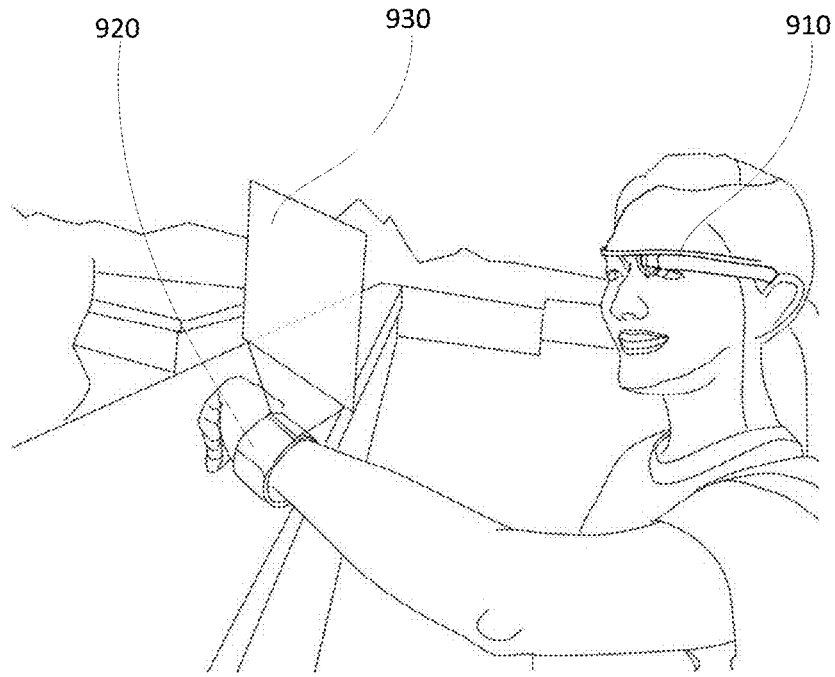
FIG. 9 is a schematic diagram of an application scenario of an interactive projection display system according to an embodiment of the present application.

FIG. 9 is a schematic diagram of interacting, by an interactive projection display system 910, with a coordination device 920 by using virtual display content 930 presented at a to-be-displayed location according to an embodiment of the present application.

In the implementation manner shown in FIG. 9, the interactive projection display system 910 is a smart glasses device, the coordination device 920 is a smart watch device, and the to-be-displayed location is an upper part of the coordination device 920.

When the coordination device 920 interacts with the interactive projection display system 910 in the embodiment of the present application, the to-be-displayed location is determined by using the foregoing method and a method recorded in the system embodiment, and the system 910 obtains display information corresponding to the coordination device 920, and then, generates corresponding virtual display content and projects the virtual display content to a fundus of a user, to cause that the user sees the virtual display content 930 displayed in FIG. 9 (FIG. 9 is a schematic diagram, and in fact, the virtual display content 930 only can be seen by a user using the system 910). In this implementation manner, the virtual display content 930 that the user sees gives the user a feeling that the virtual display content is directly displayed by the coordination device 920, and the coordination device 920 can interact, as an input device, with smart glasses in this embodiment, and further change display of the virtual display content 930, to cause natural interaction between the coordination device 920 and the user.

Figure 10:
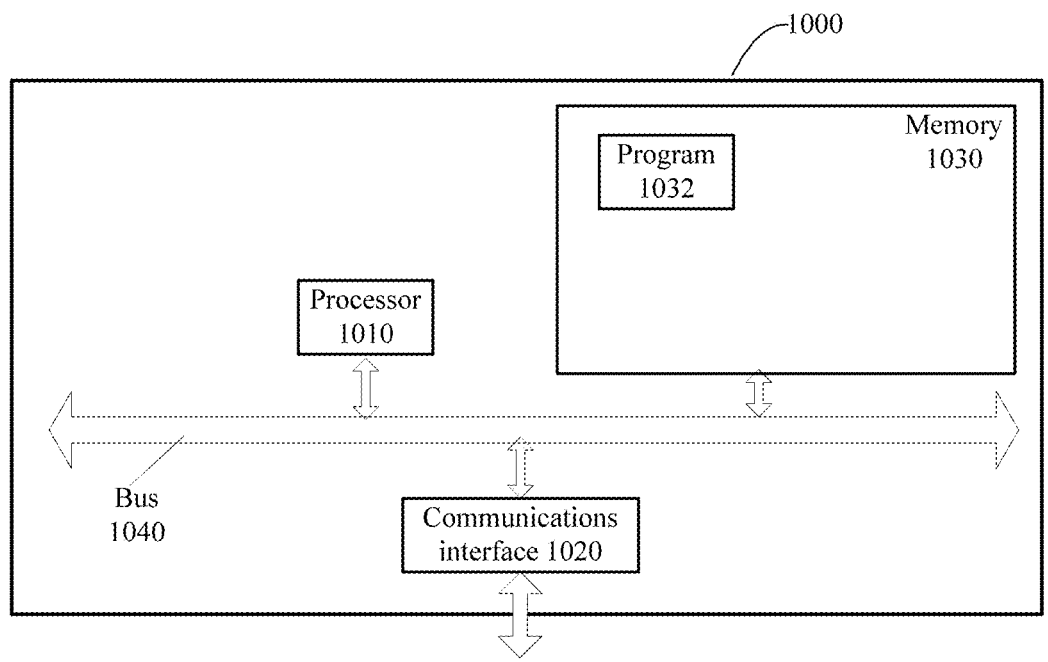
FIG. 10 is a schematic structural diagram of another interactive projection display system according to an embodiment of the present application.

FIG. 10 is a schematic structural diagram of still another interactive projection display system 1000 according to an embodiment of the present application, and specific implementation of the interactive projection display system 1000 is not limited in a specific embodiment of the present application. As shown in FIG. 10, the interactive projection display system 1000 may comprise:

a processor 1010, a communications interface 1020, a memory 1030, and a communications bus 1040.

The processor 1010, the communications interface 1020, and the memory 1030 complete mutual communication by using the communications bus 1040.

The communications interface 1020 is configured to communication with a network element such as a client.

The processor 1010 is configured to perform a program 1032, and may specifically perform related steps in the foregoing method embodiment.

Specifically, the program 1032 may comprise program code, wherein the program code comprises a computer operation instruction.

The processor 1010 may be a central processing unit (CPU) or an application specific integrated circuit (ASIC), or is configured to be one or more integrated circuits for implementing the embodiments of the present application.

The memory 1030 is configured to store the program 1032. The memory 1030 may comprise a high-speed random access memory (RAM), and may further comprise a non-volatile memory, for example, at least one disk memory. The program 1032 may specifically comprise:

- a location information obtaining module, configured to obtain current to-be-displayed location information corresponding to a coordination device;
- a display information obtaining module, configured to obtain current display information corresponding to the coordination device;
- a content generating module, configured to generate, according to the display information, current virtual display content corresponding to the coordination device; and
- a projection module, configured to project the virtual display content to a corresponding location at a fundus of a user according to the to-be-displayed location information.

For specific implementation of each unit in the program 1032, reference may be made to corresponding unit in the embodiments shown in FIG. 4 to FIG. 8, which is not described in detail herein again. It may be clearly understood by those skilled in the art that, for the purpose of convenient and brief description, for specific working processes of the units and modules described above, reference may be made to corresponding processes in the method embodiments, which are not described in detail herein again.

The system in the embodiment of the present application projects virtual display content corresponding to a coordination device to a fundus of a user, to cause that the user sees the virtual display content near the coordination device, which facilitates interaction between the user and the coordination device, and improves the user experience.

Those of ordinary skill in the art may be aware that, in combination with the examples described in the embodiments disclosed in this specification, units and method steps can be implemented by electronic hardware or a combination of computer software and electronic hardware. Whether the functions are performed by hardware or software depends on particular applications and design constraint conditions of the technical solutions. Those skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium, and comprises several instructions for instructing a computer device (which may be a personal computer, a server, a network device, or the like) to perform all or a part of the steps of the methods described in the embodiments of the present application. The storage medium comprises any medium that can store program code, such as a USB flash drive, a mobile hard disk, a read-only memory (ROM), a RAM, a magnetic disk, or an optical disc.

The foregoing implementation manners are merely intended for describing the present application rather than limiting the present application, and those of ordinary skill in related technical field can make various changes and variations without departing from the spirit and scope of the present application. Therefore, all equivalent technical solutions fall within the scope of the present application, and the patent protection scope of the present application shall be subject to the claims.

What is claimed is:

1. A method, comprising:
    obtaining, by an interactive projection display system comprising a processor, to-be-displayed location information corresponding to a coordination device, wherein a to-be-displayed location corresponding to the to-be-displayed location information is located near the coordination device;
    obtaining, by the interactive projection display system, display information corresponding to the coordination device;
    generating, by the interactive projection display system according to the display information, virtual display content corresponding to the coordination device; and
    projecting, by the interactive projection display system, the virtual display content to a location on a fundus of an eye corresponding to the to-be-displayed location information, such that the visual display content is perceived by the eye to be located at the to-be-displayed location.

2. The method of claim 1, wherein the obtaining the to-be-displayed location information comprises:
    obtaining device location information of the coordination device; and
    determining the to-be-displayed location information according to the device location information of the coordination device.

3. The method of claim 2, wherein the obtaining the device location information comprises:
    receiving the device location information from the coordination device.

4. The method of claim 2, wherein the obtaining the device location information comprises:
    receiving the device location information from an external device.

5. The method of claim 2, wherein the obtaining the device location information comprises:
    detecting the device location information.

6. The method of claim 5, wherein the detecting the device location information comprises:
    detecting a first location of a gaze point of the eye; and
    determining the device location information according to the first location of the gaze point.

7. The method of claim 6, wherein the detecting the first location of the gaze point of the eye comprises:
    acquiring at least one image at the fundus of the eye at a second location;
    adjusting, to acquire an image of the at least one image that satisfies at least one defined clarity criterion, at least one imaging parameter of an optical path between the second location to acquire the at least one image and the eye; and analyzing the at least one image to obtain the at least one imaging parameter and at least one optical parameter of the eye corresponding to the image that satisfies the at least one defined clarity criterion, and acquiring the first location of the gaze point of the eye relative to the eye.

8. The method of claim 7, wherein the adjusting the at least one parameter comprises:

adjusting a focal length of at least one optical device on the optical path or a third location of the at least one optical device on the optical path.

9. The method of claim 7, wherein the adjusting the at least one parameter further comprises:

transferring, separately corresponding to different locations of a pupil of the eye in response to different optical axis directions of the eye, the at least one image presented at the fundus to the second location.

10. The method of claim 7, wherein the detecting the first location of the gaze point of the eye further comprises:

projecting a light spot pattern to the fundus of the eye.

11. The method of claim 5, wherein the detecting the device location information comprises:

detecting interaction information associated with the coordination device; and determining the device location information according to the interaction information.

12. The method of claim 2, wherein the determining the to-be-displayed location information comprises:

determining the to-be-displayed location information according to the device location information and a preset rule.

13. The method of claim 1, wherein the obtaining the to-be-displayed location information comprises:

obtaining the to-be-displayed location information through user input.

14. The method of claim 1, wherein the obtaining the display information comprises:

obtaining the display information from the coordination device.

15. The method of claim 1, wherein the obtaining the display information comprises:

obtaining the display information from an external device.

16. The method of claim 1, wherein the generating the virtual display content comprises:

generating the virtual display content according to the to-be-displayed location information and the display information.

17. The method of claim 16, wherein the virtual display content comprises perspective information corresponding to the to-be-displayed location information.

18. The method of claim 16, wherein the generating the virtual display content comprises:

generating the virtual display content separately corresponding to two eyes.

19. The method of claim 1, wherein the projecting the virtual display content comprises:

adjusting at least one projection imaging parameter of an optical path between a projection location and the fundus according to the to-be-displayed location information.

20. The method of claim 19, wherein the adjusting the at least one projection imaging parameter comprises:

adjusting at least one imaging parameter of at least one other optical device on another optical path or another location of the at least one another optical device on the other optical path.

21. The method of claim 19, wherein the projecting the virtual display content further comprises:

projecting, separately corresponding to different locations of a pupil in response to different optical axis directions of the eye related to the fundus, the virtual display content to the fundus.

22. The method of claim 21, wherein the projecting the virtual display content comprises:

performing, on the virtual display content, counter-deformation processing corresponding to the different locations of the pupil.

23. The method of claim 19, wherein the projecting the virtual display content comprises:

controlling a size of the virtual display content projected on the fundus.

24. The method of claim 1, further comprising:

obtaining, by the interactive projection display system, a trigger signal and triggering the obtaining of the to-be-displayed location information and the obtaining of the display information.

25. The method of claim 1, wherein the coordination device is a wearable device.

26. A system, comprising:

a memory that stores executable components; and a processor, coupled to the memory, that executes the executable components to perform operations of the system, the executable components comprising:

a location information obtaining apparatus configured to obtain to-be-displayed location information corresponding to a coordination device, wherein a to-be-displayed location corresponding to the to-be-displayed location information is located near the coordination device;

a display information obtaining apparatus configured to obtain display information corresponding to the coordination device;

a content generating apparatus configured to generate, according to the display information, virtual display content corresponding to the coordination device; and a projection apparatus configured to project the virtual display content to a location on a fundus of an eye corresponding to the to-be-displayed location information, such that the visual display content is perceived by the eye to be located at the to-be-displayed location.

27. The system of claim 26, wherein the location information obtaining apparatus comprises:

a device location obtaining module configured to obtain device location information of the coordination device; and a to-be-displayed location determining module configured to determine the to-be-displayed location information according to the device location information.

28. The system of claim 27, wherein the device location obtaining module comprises:

a communications submodule configured to receive the device location information.

29. The system of claim 28, wherein the communications submodule is further configured to:

receive the device location information from the coordination device.

30. The system of claim 28, wherein the communications submodule is further configured to:

receive the device location information from an external device.

31. The system of claim 27, wherein the device location obtaining module comprises:
a detection submodule configured to detect the device location information.

32. The system of claim 31, wherein the detection submodule comprises:
a gaze point detection unit configured to detect a first location of a gaze point of the eye; and
a device location determining unit configured to determine the device location information according to the first location of the gaze point.

33. The system of claim 32, wherein the gaze point detection unit comprises:
an image acquisition subunit configured to acquire at least one image at the fundus of the eye at a second location;
an adjustable imaging subunit configured to adjust at least one imaging parameter of an optical path between the image acquisition subunit and the eye to acquire an image of the at least one image that satisfies at least one defined clarity criterion; and
an image processing subunit configured to analyze the at least one image to obtain the at least one imaging parameter and at least one optical parameter of the eye corresponding to the image that satisfies the at least one defined clarity criterion, and acquire the first location of the gaze point of the eye relative to the eye.

34. The system of claim 33, wherein the adjustable imaging subunit comprises:
an adjustable lens device, wherein at least one imaging parameter of the adjustable lens device being adjustable or a third location of the adjustable lens device on the optical path being adjustable.

35. The system of claim 33, wherein the adjustable imaging subunit further comprises:
a curved beam splitting device configured to transfer, separately corresponding to different locations of a pupil of the eye in response to different optical axis directions of the eye, the at least one image presented at the fundus to the image acquisition subunit.

36. The system of claim 33, wherein the gaze point detection unit further comprises:
a projection subunit configured to project a light spot pattern to the fundus of the eye.

37. The system of claim 31, wherein the detection submodule further comprises:
an interaction detection unit configured to detect interaction information associated with the coordination device; and
a device location determining unit configured to determine the device location information according to the interaction information.

38. The system of claim 27, wherein the to-be-displayed location determining module is further configured to determine the to-be-displayed location information according to the device location information and a preset rule.

39. The system of claim 26, wherein the device location information obtaining apparatus comprises:
an interaction obtaining module configured to obtain the to-be-displayed location information through user input.

40. The system of claim 26, wherein the display information obtaining apparatus comprises:
a communications module configured to obtain the display information corresponding to the coordination device from the coordination device.

41. The system of claim 26, wherein the display information obtaining apparatus comprises:
a communications module configured to obtain the display information corresponding to the coordination device from an external device.

42. The system of claim 26, wherein the content generating apparatus is further configured to generate the virtual display content according to the to-be-displayed location information and the display information.

43. The system of claim 42, wherein the content generating apparatus is further configured to generate the virtual display content comprising perspective information corresponding to the to-be-displayed location information.

44. The system of claim 42, wherein the content generating apparatus is further configured to generate the virtual display content separately corresponding to two eyes of the user.

45. The system of claim 26, wherein the projection apparatus comprises:
an imaging adjustment module configured to adjust at least one projection imaging parameter of an optical path between the projection module and the fundus according to the to-be-displayed location information.

46. The system of claim 45, wherein the imaging adjustment module comprises:
an adjustable lens device, wherein at least one imaging parameter of the adjustable lens device is adjustable or another location of the adjustable lens device on the optical path being adjustable.

47. The system of claim 45, wherein the imaging adjustment module comprises:
a curved beam splitting unit configured to project, separately corresponding to different locations of a pupil in response to different optical axis directions of the eye related to the fundus, the virtual display content to the fundus.

48. The system of claim 47, wherein the projection apparatus comprises:
a counter-deformation processing module configured to perform, on the virtual display content, counter-deformation processing corresponding to the different locations of the pupil.

49. The system of claim 45, wherein the projection apparatus comprises:
a projection control module configured to control a size of the virtual display content projected on the fundus.

50. The system of claim 26, wherein the executable components further comprise:
a triggering apparatus configured to obtain a trigger signal and trigger the location obtaining apparatus and the display information obtaining apparatus.

51. The system of claim 33, wherein functions of the gaze point detection unit and the projection apparatus are implemented by a same device.

52. The system of claim 26, wherein the coordination device is a wearable device.

53. The system of claim 26, wherein the system is a wearable device used near the eye.

54. A computer readable storage device, comprising at least one executable instruction, which, in response to execution, causes a system comprising a processor to perform operations, comprising:
receiving to-be-displayed location information corresponding to a coordination device and display information corresponding to the coordination device, wherein a to-be-displayed location corresponding to the to-be-displayed location information is located near the coordination device;

generating, according to the display information, virtual display content corresponding to the coordination device; and projecting the virtual display content to a location on a fundus of an eye corresponding to the to-be-displayed location information, such that the visual display content is perceived by the eye to be located at the to-be-displayed location.

* * * * *